US008151290B1

(12) United States Patent
Ujihara

(10) Patent No.: US 8,151,290 B1
(45) Date of Patent: Apr. 3, 2012

(54) TELEVISION PROGRAM DATABASE ARCHITECTURE

(75) Inventor: Karen Ujihara, Irvine, CA (US)

(73) Assignee: Corporate Media Partners, Irving, TX (US)

( * ) Notice: Subject to any disclaimer, the term of this patent is extended or adjusted under 35 U.S.C. 154(b) by 1056 days.

(21) Appl. No.: 10/124,761

(22) Filed: Apr. 16, 2002

Related U.S. Application Data

(60) Provisional application No. 60/284,399, filed on Apr. 17, 2001, provisional application No. 60/283,921, filed on Apr. 16, 2001.

(51) Int. Cl.
*H04N 7/16* (2006.01)
(52) U.S. Cl. .............................. 725/1; 725/139; 707/756
(58) Field of Classification Search .................. 345/769, 345/733, 744, 810, 835, 716, 717, 745–747; 386/83; 725/58
See application file for complete search history.

(56) References Cited

U.S. PATENT DOCUMENTS

| 4,723,212 | A | * | 2/1988 | Mindrum et al. | .......... | 705/14.26 |
| 4,882,675 | A | * | 11/1989 | Nichtberger et al. | ...... | 705/14.35 |
| 5,600,573 | A | | 2/1997 | Hendricks et al. | ............. | 725/109 |
| 5,892,508 | A | | 4/1999 | Howe et al. | .................... | 725/131 |
| 6,201,536 | B1 | | 3/2001 | Hendricks et al. | ............. | 345/716 |
| 6,670,971 | B1 | * | 12/2003 | Oral | .............................. | 715/769 |
| 2003/0088483 | A1 | * | 5/2003 | Moyer | ........................... | 705/27 |
| 2003/0095791 | A1 | * | 5/2003 | Barton et al. | ................... | 386/83 |
| 2003/0097657 | A1 | * | 5/2003 | Zhou et al. | ....................... | 725/46 |
| 2006/0010469 | A1 | * | 1/2006 | Reynolds et al. | .............. | 725/39 |
| 2010/0223640 | A1 | * | 9/2010 | Reichardt et al. | ............. | 725/32 |

FOREIGN PATENT DOCUMENTS

| WO | W09749242 A1 | 12/1997 |
| WO | W09837694 A1 | 8/1998 |

OTHER PUBLICATIONS

K. McDonald et al., Online Television Library: Organisation and Content Browsing for General Users, Centre for Digital Video Processing, Dublin City University, Ireland, undated (9 pages).
H. Lee, et al., User Interface Issues for Browsing Digital Video, School of Computer Applications, Dublin City University, Glasnevin, Dublin 9, Ireland, dated 1999 (11 pages).
T.D.C. Little et al. A Digital On-Demand Video Service Supporting Content-Based Queries, Boston University, undated, (10 pages).

* cited by examiner

*Primary Examiner* — Belix M Ortiz
(74) *Attorney, Agent, or Firm* — Polsinelli Shughart PC

(57) ABSTRACT

The present invention provides a data structure for selection of products containing presentable programming as well as a computerized user-interactive system for facilitating allowing a user to select and be provided with deliverable entities including one or more presentable programs. The system and data structure of the invention allow effective, organized, and convenient browsing, selection, conceptual packaging of presentable program-containing products. The system and data structure of the invention further allow efficient structuring and storage of information associated therewith and useful in facilitating effective computerized representation, storage, and delivery of such products. Each product may include multiple deliverable entities, such as multiple programs and merchandize.

20 Claims, 44 Drawing Sheets

| product sector | product sort | guide tool channel tool poster/prod uct name | range prod ID prod ID st | prod ID end | Opt rec | opt sec | selection fields, unique to purchase option options | select prod st day | select prod st date | select prod st time | product duration | purchase ack | program days | program date | program start times | program duration | disp show ing | serv ID | sche d rec | marq ID | channel tool guide tool marquee name | cat event content category |
|---|---|---|---|---|---|---|---|---|---|---|---|---|---|---|---|---|---|---|---|---|---|---|
| am movies/dr | movies-hits | sci fi fest | | | 15 | 1 | sampler | | | | | | na | na | day/t bm | 2 hr | no | | | | star trek-movie | sci-fi |
| am movies/dr | movies-hits | sci fi fest | 1261 | 1263 | 17 | 1 | star war | na | 29-Jan | na | 72 hr | | na | na | day/t bm | 2 hr | | | | | star wars | sci-fi |
| am movies/dr | movies-hits | sci fi fest | 1261 | 1263 | 17 | 1 | star wars only | | | | 72 hr | | na | na | day/t bm | 2 hr | | | | | star wars-empr | sci-fi |
| am movies/dr | movies-hits | sci fi fest | 1261 | 1263 | 17 | 1 | star wars only | | | | 72 hr | | na | na | day/t bm | 2 hr | | | | | star wars-jedi | sci-fi |
| am movies/dr | movies-hits | sci fi fest | 1261 | 1263 | 18 | 1 | weekend | | | | 72 hr | | na | na | day/t bm | 2 hr | | | | | star trek-movie | sci-fi |
| am movies/dr | movies-hits | sci fi fest | 1261 | 1263 | 18 | 1 | weekend | | | | 72 hr | | na | na | day/t bm | 2 hr | | | | | star trek series- | sci-fi |
| am movies/dr | movies-hits | sci fi fest | 1261 | 1263 | 18 | 1 | weeken | na | 29-Jan | na | 72 hr | | na | na | day/t bm | 2 hr | | | | | star wars | sci-fi |
| am movies/dr | movies-hits | sci fi fest | 1261 | 1263 | 18 | 1 | weekend | | | | 72 hr | | na | na | day/t bm | 2 hr | | | | | star wars-empr | sci-fi |
| am movies/dr | movies-hits | sci fi fest | 1261 | 1263 | 18 | 1 | weekend | | | | 72 hr | | na | na | day/t bm | 2 hr | | | | | star wars-jedi | sci-fi |
| am movies/dr | movies-hits | sci fi fest | | | 18 | 1 | weekend | | | | | | na | na | day/t bm | 2 hr | | | | | star trek-movie | sci-fi |
| am movies/dr | movies-hits | star trek | | | 19 | 1 | one time | na | | day/t bm | 2 hr | | na | na | day/t bm | 2 hr | | | | | | sci-fi |
| am movies/dr | movies-john wayn | john wayne mo | 1261 | 1263 | 20 | 1 | all movies | fri, sa, | na | 6a8a,8a | 24 hr | | na | na | day/t bm | 2 hr | | 130 | 800 | 15 | the quiet man | classic |
| am movies/dr | movies-john wayn | john wayne mo | 1261 | 1263 | 20 | 1 | all movies | fri, sa, | na | 6a8a,8a | 24 hr | | na | na | day/t bm | 2 hr | | 131 | 801 | 15 | stage coach | western |
| am movies/dr | movies-john wayn | john wayne mo | 1261 | 1263 | 20 | 1 | all movies | fri, sa, | na | 6a8a,8a | 24 hr | | na | na | day/t bm | 2 hr | | 128 | 802 | 4 | true grit | western |
| am movies/dr | movies-john wayn | john wayne mo | 1261 | 1263 | 20 | 1 | all movies | fri, sa, | na | 6a8a,8a | 24 hr | | na | na | day/t bm | 2 hr | | 129 | 803 | 4 | stage coach | western |
| am movies/dr | movies-john wayn | john wayne mo | 1261 | 1263 | 20 | 1 | all movies | fri, sa, | na | 6a8a,8a | 24 hr | | na | na | day/t bm | 2 hr | | 132 | 804 | 16 | true grit | western |
| am movies/dr | movies-john wayn | john wayne mo | 1264 | 1266 | 21 | 1 | all evenin | fri, sa, | na | 6p,6p,6p | 6 hr | | na | na | day/t bm | 2 hr | | 133 | 805 | 16 | the quiet man | classic |
| am movies/dr | movies-john wayn | john wayne mo | 1264 | 1266 | 21 | 1 | all evenin | fri, sa, | na | 6p,6p,6p | 6 hr | | na | na | day/t bm | 2 hr | | 130 | 800 | 15 | the quiet man | classic |
| am movies/dr | movies-john wayn | john wayne mo | 1264 | 1266 | 21 | 1 | all evenin | fri, sa, | na | 6p,6p,6p | 6 hr | | na | na | day/t bm | 2 hr | | 131 | 801 | 15 | stage coach | western |
| am movies/dr | movies-john wayn | john wayne mo | 1264 | 1266 | 21 | 1 | all evenin | fri, sa, | na | 6p,6p,6p | 6 hr | | na | na | day/t bm | 2 hr | | 128 | 802 | 4 | true grit | western |
| am movies/dr | movies-john wayn | john wayne mo | 1264 | 1266 | 21 | 1 | all evenin | fri, sa, | na | 6p,6p,6p | 6 hr | | na | na | day/t bm | 2 hr | | 129 | 803 | 4 | stage coach | western |
| am movies/dr | movies-john wayn | john wayne mo | 1264 | 1266 | 21 | 1 | all evenin | fri, sa, | na | 6p,6p,6p | 6 hr | | na | na | day/t bm | 2 hr | | 132 | 804 | 16 | true grit | western |
| am movies/dr | movies-john wayn | john wayne mo | 1267 | 1267 | 22 | 1 | weekend | na | 29-Jan | 6p | na | | sa | st | 8p | 2 hr | | 133 | 805 | 16 | the quiet man | classic |
| am movies/dr | movies-john wayn | john wayne mo | 1267 | 1267 | 22 | 1 | weekend | na | 29-Jan | 6p | na | | fr | st | 6p | 2 hr | | 128 | 801 | 15 | stage coach | western |
| am movies/dr | movies-john wayn | john wayne mo | 1267 | 1267 | 22 | 1 | weekend | na | 29-Jan | 6p | na | | su | st | 10p | 2 hr | | 132 | 902 | 14 | true grit | western |
| am movies-new | barney's great adventure | | | | 23 | | | na | na | na | na | day/t bm | 2 hr | na | na | | | no | | | | |
| am movies/dram | scream | | | | 24 | | | | | | | You have purchased | na | na | day/t bm | 1 hr | | | | | barney's great advent | children |
| am movies/dram | all my children | | | | 25 | 1 | all episod | sa, su | na | day/t bm | 24 hr | You have purchased | na | na | day/t bm | 1 hr | | | | | scream | horror |
| am movies/dram | all my children | | | | 25 | 1 | all episodes, all day | | | | 24 hr | | na | na | day/t bm | 1 hr | | | | | all my children wed | soap |
| am movies/dram | all my children | | | | 25 | 1 | all episodes, all day | | | | 24 hr | | na | na | day/t bm | 1 hr | | | | | all my children fri | soap |
| am movies/dram | all my children | | | | 25 | 1 | all episodes, all day | | | | 24 hr | | na | na | day/t bm | 1 hr | | | | | all my children mon | soap |
| am movies/dram | all my children | | | | 25 | 1 | all episodes, all day | | | | 24 hr | | na | na | day/t bm | 1 hr | | | | | all my children thurs | soap |
| am movies/dram | all my children | | | | 27 | 1 | every episode | | | | 5 hr | | na | na | day/t bm | 1 hr | | | | | all my children tues | soap |
| am movies/dram | all my children | | | | 27 | 1 | every episode | | | | 5 hr | | na | na | day/t bm | 1 hr | | | | | all my children wed | soap |
| am movies/dram | all my children | | | | 27 | 1 | every episode | | | | 5 hr | | na | na | day/t bm | 1 hr | | | | | all my children fri | soap |
| am movies/dram | all my children | | | | 27 | 1 | every episode | | | | 5 hr | | na | na | day/t bm | 1 hr | | | | | all my children mon | soap |
| am movies/dram | all my children | | | | 27 | 1 | every episode | | | | 5 hr | | na | na | day/t bm | 1 hr | | | | | all my children thurs | soap |
| am movies/dram | all my children | | | | 28 | 1 | In episode | na | | day/t bm | 2 hr | | na | na | day/t bm | 1 hr | | | | | all my children tues | soap |
| am movies/dram | all my children | | | | 29 | 1 | mon episo | na | | | 1 hr | | na | na | day/t bm | 1 hr | | | | | all my children mon | soap |
| am movies/dram | all my children | | | | 30 | 1 | thurs epis | na | | | 1 hr | | na | na | day/t bm | 1 hr | | | | | all my children thurs | soap |
| am movies/dram | all my children | | | | 31 | 1 | tues epis | na | | | 1 hr | | na | na | day/t bm | 1 hr | | | | | all my children tues | soap |
| am movies/dram | all my children | | | | 32 | 1 | wed episo | na | | | 1 hr | | na | na | day/t bm | 1 hr | | | | | all my children wed | soap |
| am movies-soap | days of our lives | | | | 46 | | | | | | | | | | | | | | | | days of our lives fri | soap |
| am movies-soap | days of our lives | | | | 47 | | | | | | | | | | | | | | | | days of our lives mon | soap |
| am movies-soap | days of our lives | | | | 48 | | | | | | | | | | | | | | | | days of our lives tues | soap |

FIG. 4C

| pick | guide tool | | range prod | | | | | selection fields, unique to purchase option | | | | | program start times, unique to marquee | | | | | channel tool | | cat |
|---|---|---|---|---|---|---|---|---|---|---|---|---|---|---|---|---|---|---|---|---|
| | channel tool | | range prod ID | | | | | selection fields, unique to purchase option | | | | | program start times, unique to marquee | | | | | guide tool | | |
| product sector | product sort | poster/prod uct name | prod ID st | prod ID end | Opt rec | opt sec | options | select prod st day | select prod st date | select prod st time | product duration | purchase ack | program days | program date | program start times | program duration | serv ID | sche d rec | marq ID | marquee name | event content category |
| am movies/dram | movies-soap | days of our lives | | | | | | | | | | | | | dawt bm | 1 hr | | | | days of our lives wed | soap |
| other | other-express vu | exv's movies | | | 49 | 1 | | | | | | | | | x | x | | | | their guide | per movie |
| other | other-viewer's ch | vc's movies | | | | | | | | | | | | | | | | | | their guide | per movie |
| Services | services-email | email | | | 70 | 1 | na | | | | | | | | | | | | | email | services |
| Services | services-internet | internet access | | | 69 | 1 | na | | | | | | | | | | | | | internet access | services |
| Services | services-music | music choice | | | 67 | 1 | music-10 | | | | | | | | | | | | | music choice 1-10 | music |
| Services | services-music | music choice | | | 66 | 1 | music-20 | | | | | | | | | | | | | music choice 1-20 | music |
| Services | services-premium | Encore | | | 66 | 1 | na | | | | | | | | | | | | | Encore | movie ch |
| Services | services-premium | HBO | | | 60 | 1 | east | na | na | na | | | | | | na | | | | HBO east | movie ch |
| Services | services-premium | HBO | | | 61 | 1 | west | | | | | | | | | | | | | HBO west | movie ch |
| Services | services-premium | HBO | | | 62 | 1 | east and west | | | | | | | | | | | | | HBO east | movie ch |
| Services | services-premium | HBO and Showtime | | | 62 | 1 | east and west | | | | | | | | | | | | | HBO west | movie ch |
| Services | services-premium | HBO and Showtime | | | 63 | 1 | na | | | | | | | | | | | | | HBO east | movie ch |
| Services | services-premium | HBO and Showtime | | | 63 | 1 | na | | | | sub | .purchase | | | | | | | | HBO west | movie ch |
| Services | services-premium | Showtime | | | 63 | 1 | na | | | | | | | | | | | | | Showtime | movie ch |
| Services | services-premium | STARZ | | | 64 | 1 | na | | | | | | | | | | | | | Showtime | movie ch |
| sports | sports - mlb | world series | | | 65 | 1 | na | | | | | | | | | | | | | Starz | movie ch |
| sports | sports - mlb | world series | | | 39 | 1 | na | na | na | na | na | You have pu | na | 15-Aug | 1p | 2 hr | 450 | | x vs. y 1 | baseball |
| sports | sports - mlb | world series | | | 39 | 1 | na | na | na | na | na | You have pu | na | 16-Aug | 1p | 2 hr | 450 | | x vs. y 2 | baseball |
| sports | sports - mlb | world series | | | 39 | 1 | na | na | na | na | na | You have pu | na | 17-Aug | 1p | 2 hr | 450 | | x vs. y 3 | baseball |
| sports | sports - mlb | world series | | | 39 | 1 | na | na | na | na | na | You have pu | na | 18-Aug | 1p | 2 hr | 450 | | x vs. y 4 | baseball |
| sports | sports - nba | nba game pass | | | 39 | 1 | na | na | na | na | na | You have pu | na | 19-Aug | tbs | 2 hr | 450 | | x vs. y 5 | baseball |
| sports | sports - nba | nba game pass | | | 40 | 1 | full seaso | na | 1-Feb | 10a | na | | na | 20-Aug | tbs | 2 hr | 450 | | x vs. y 6 | baseball |
| sports | sports - nba | nba game pass | | | 40 | 1 | full seaso | na | 1-Feb | na | na | | na | | | 2 hr | | | | basketball |
| sports | sports - nba | nba game pass | | | 40 | 1 | full seaso | na | 1-Feb | na | na | | na | 1-Feb | 10a | 2 hr | | | a vs. b | basketball |
| sports | sports - nba | nba game pass | | | 40 | 1 | full seaso | na | 1-Feb | na | na | | na | 1-Feb | 12n | 2 hr | | | c vs. d | basketball |
| sports | sports - nba | nba game pass | | | 41 | 1 | half seaso | na | 1-Feb | na | na | | na | 1-Feb | 2p | 2 hr | | | e vs. f | basketball |
| sports | sports - nba | nba game pass | | | 41 | 1 | half seaso | na | 1-Feb | na | na | | na | 1-Feb | 10a | 2 hr | | | a vs. b | basketball |
| sports | sports - nba | weekend pass | | | 42 | 1 | 30-Jan | na | | | na | | na | 1-Feb | 12n | 2 hr | | | c vs. d | basketball |
| sports | sports - nba | weekend pass | | | 42 | 1 | 30-Jan | na | | | na | | na | 30-Jan | 2p | 2 hr | | | a vs. b | basketball |
| sports | sports - nfl | m vs n | | | 43 | 1 | one game | 5-Feb | | | na | | na | 31-Jan | 2p | 2 hr | | | c vs. d | basketball |
| sports | sports - nfl | nfl Sunday ticket | | | 44 | 1 | 31-Jan | na | | | na | | na | 5-Feb | 6p | 2 hr | | | m vs. n | basketball |
| sports | sports - nfl | nfl Sunday ticket | | | 44 | 1 | 31-Jan | na | | | na | | na | 31-Jan | | 2 hr | | | m vs. n | football |
| sports | sports - nfl | nfl Sunday ticket | | | 44 | 1 | 31-Jan | na | | | na | | na | 31-Jan | 10a | 2 hr | | | o vs. p | football |
| sports | sports - nfl | nfl Sunday ticket | | | 44 | 1 | 31-Jan | na | | | na | | na | 31-Jan | 12n | 2 hr | | | q vs. r | football |

| | MONDAY, MARCH 8 | | TUESDAY, MARCH 9 |
|---|---|---|---|
| | | 1438 | 1440 |
| YOU MAY CHOOSE AMONG THE DISPLAYED DATES/TIMES FOR THE PROGRAMS YOU HAVE SELECTED. | | | |
| 2 | LITTLE MERMAID | 9:00p | 9:00p |
| 4 | LITTLE MERMAID | 10:00p | 10:00p |
| 5 | LITTLE MERMAID | 11:00p | 11:00p |
| 7 | LITTLE MERMAID | 12:00p | 12:00p |
| 9 | 101 DALMATIONS | 9:30p | 9:30p |
| 11 | 101 DALMATIONS | 10:30p | 10:30p |
| 13 | 101 DALMATIONS | 11:30p | 11:30p |
| 18 | 101 DALMATIONS | 12:30p | 12:30p |
| 22 | 101 DALMATIONS | 1:30a | 1:30a |

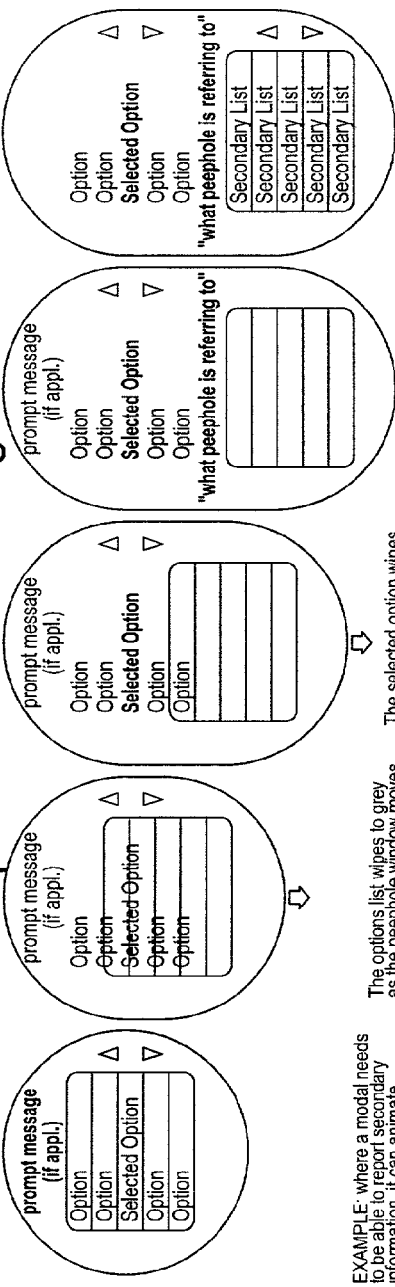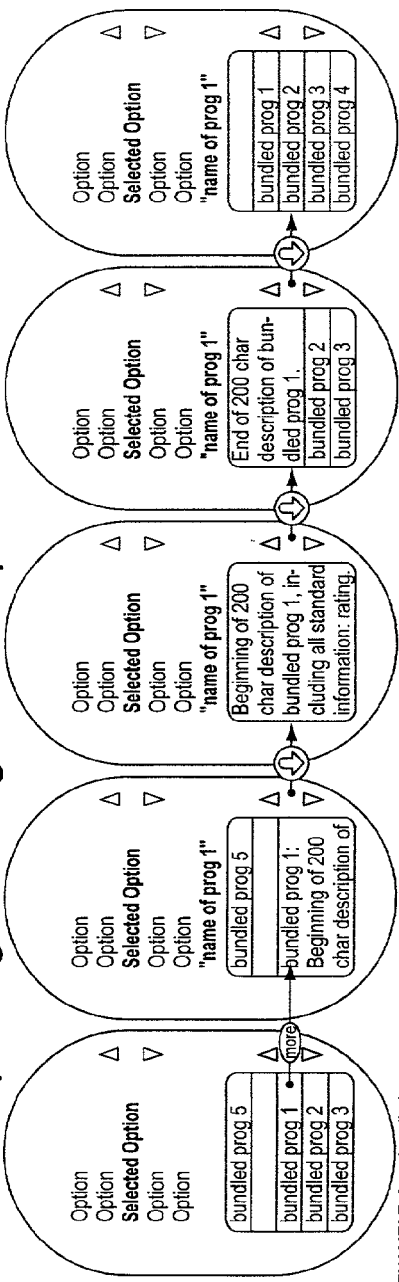
FIG. 13

Express Guide-Time Progression

9:00-9:14p

| Guide | | Titles | current | next |
|---|---|---|---|---|
| all express | | | | |
| express now | new | Matrix | 9:00p | 9:30p |
| <now+30> | new | Pushing Tin | 8:45p | 9:15p |
| <now+60> | pre-served | Shakespeare in Love | 9:00p | 9:15p |
| <now+1:30> | pre-served | Bug's Life | 8:15p | 9:15p |
| d showcase | ☼ | Men in Black | 9:00p | 10:00p |
| PPV | | | | |
| mature | LAST! | The Boxer | | |
| | special | Will Smith Pack | Men in Black | Bad Boys |
| ○○○ | special | Scorsese Subscription | one week | two week |
| 9:01p | special | | | |

9:15-9:29p

| Guide | | Titles | current | next |
|---|---|---|---|---|
| all express | | | | |
| express now | new | Matrix | 9:00p | 9:30p |
| <now+30> | new | Pushing Tin | 9:15p | 9:45p |
| <now+60> | pre-served | Shakespeare in Love | 9:15p | 9:30p |
| <now+1:30> | pre-served | Bug's Life | 9:15p | 10:15p |
| d showcase | ☼ | Men in Black | 9:00p | 9:30p |
| PPV | | | | |
| mature | LAST! | The Boxer | | |
| | special | Will Smith Pack | Men in Black | Bad Boys |
| ○○○ | special | Scorsese Subscription | one week | two week |
| 9:17p | special | | | |

9:30-9:44p

| Guide | | Titles | current | next |
|---|---|---|---|---|
| all express | | | | |
| express now | new | Matrix | 9:30p | 10:00p |
| <now+30> | new | Pushing Tin | 9:15p | 9:45p |
| <now+60> | pre-served | Shakespeare in Love | 9:30p | 9:45p |
| <now+1:30> | pre-served | Bug's Life | 9:15p | 10:15p |
| d showcase | ☼ | Men in Black | 9:00p | 10:00p |
| PPV | | | | |
| mature | LAST! | The Boxer | 9:30p | |
| | special | Will Smith Pack | Men in Black | Bad Boys |
| ○○○ | special | Scorsese Subscription | one week | two week |
| 9:33p | special | | | |

9:45-9:59p

| Guide | | Titles | current | next |
|---|---|---|---|---|
| all express | | | | |
| express now | new | Matrix | 9:30p | 10:00p |
| <now+30> | new | Pushing Tin | 9:45p | 10:15p |
| <now+60> | pre-served | Shakespeare in Love | 9:45p | 10:00p |
| <now+1:30> | pre-served | Bug's Life | 9:15p | 10:15p |
| d showcase | ☼ | Men in Black | 9:00p | 10:00p |
| PPV | | | | |
| mature | LAST! | The Boxer | 9:30p | |
| | special | Will Smith Pack | Men in Black | Bad Boys |
| ○○○ | special | Scorsese Subscription | one week | two week |
| 9:46p | special | | | | package in Lens

| Guide | | Titles | choices | |
|---|---|---|---|---|
| all express | | | | |
| express now | pre-served | Shakespeare in Love | 9:45p | 10:00p |
| <now+30> | pre-served | Bug's Life | 9:15p | 10:15p |
| <now+60> | ☼ | Men in Black | 9:00p | 10:00p |
| <now+1:30> | LAST! | The Boxer | 9:30p | |
| d showcase | special | Will Smith Pack | Men in Black | Bad Boys |
| PPV | special | Scorsese Subscription | one week | two week |
| mature | new | Matrix | 9:30p | 10:00p |
| ○○○ | new | Pushing Tin | 9:45p | 10:15p |
| 9:46p | | | | |

FIG. 14

Express Guide-Package Scrolling (1 of 2)

START

| Guide | | Titles | current | next |
|---|---|---|---|---|
| all express express now <now+30> <now+60> <now+1:30> d showcase PPV mature | new | Matrix | 9 00p | 9 30p |
| | new | Pushing Tin | 9 15p | 9 45p |
| | on sased | Shakespeare in Love | 9 00p | 9 15p |
| | on sased | Bug's Life | 9 15p | 10 15p |
| ☼ | | Men in Black | 9 00p | 10 00p |
| 8:55a | LAST! | The Boxer | 9 30p | — |
| | special | Will Smith Pack | Men in Black | Bad Boys |
| | special | Scorsese Subscription | one week | two week |
| | special | | | |

Scroll RIGHT 1x

| Guide | | Titles | current | next |
|---|---|---|---|---|
| all express express now <now+30> <now+60> <now+1:30> d showcase PPV mature | new | Matrix | 9 00p | 9 30p |
| | new | Pushing Tin | 9 15p | 9 45p |
| | on sased | Shakespeare in Love | 9 00p | 9 15p |
| | on sased | Bug's Life | 9 15p | 10 15p |
| ☼ | | Men in Black | 9 00p | 10 00p |
| 8:55a | LAST! | The Boxer | 9 30p | — |
| | special | Will Smith Pack | Men in Black | Bad Boys |
| | special | Scorsese Subscription | one week | two week |
| | special | | | |

Scroll RIGHT 2x

| Guide | | Titles | next | showtimes |
|---|---|---|---|---|
| all express express now <now+30> <now+60> <now+1:30> d showcase PPV mature | new | Matrix | 9 30p | 10 00p |
| | new | Pushing Tin | 9 45p | 10 15p |
| | on sased | Shakespeare in Love | 9 15p | 9 30p |
| | on sased | Bug's Life | 10 15p | 11 15p |
| ☼ | | Men in Black | 10 00p | 11 00p |
| 8:55a | LAST! | The Boxer | — | — |
| | special | Will Smith Pack | Bad Boys | Independe |
| | special | Scorsese Subscription | two week | — |
| | special | | | |

START

| Guide | | Titles | current | next |
|---|---|---|---|---|
| all express express now <now+30> <now+60> <now+1:30> d showcase PPV mature | new | Matrix | 9 00p | 9 30p |
| | new | Pushing Tin | 9 15p | 9 45p |
| | on sased | Shakespeare in Love | 9 00p | 9 15p |
| | on sased | Bug's Life | 9 15p | 10 15p |
| ☼ | | Men in Black | 9 00p | 10 00p |
| 8:55a | LAST! | The Boxer | 9 30p | — |
| | special | Will Smith Pack | Men in Black | Bad Boys |
| | special | Scorsese Subscription | one week | two week |
| | special | | | |

Scroll LEFT 1x

| Guide | | Titles | past | current |
|---|---|---|---|---|
| all express express now <now+30> <now+60> <now+1:30> d showcase PPV mature | new | Matrix | 8 30p | 9 00p |
| | new | Pushing Tin | 8 45p | 9 15p |
| | on sased | Shakespeare in Love | 9 00p | 9 15p |
| | on sased | Bug's Life | 8 15p | 9 15p |
| ☼ | | Men in Black | 8 00p | 9 00p |
| 8:55a | LAST! | The Boxer | 8 30p | 9 30p |
| | special | Will Smith Pack | — | Men in Black |
| | special | Scorsese Subscription | — | one week |
| | special | | | |

Scroll LEFT 2x

| Guide | | Titles | past | — |
|---|---|---|---|---|
| all express express now <now+30> <now+60> <now+1:30> d showcase PPV mature | new | Matrix | 8 00p | 8 30p |
| | new | Pushing Tin | 8 45p | 8 45p |
| | on sased | Shakespeare in Love | 8 45p | 9 00p |
| | on sased | Bug's Life | 7 15p | 8 15p |
| ☼ | | Men in Black | 7 00p | 8 00p |
| 8:55a | LAST! | The Boxer | — | 8 30p |
| | special | Will Smith Pack | — | — |
| | special | Scorsese Subscription | — | — |
| | special | | | |

Note that times in the past are indicated by displaying the time text in gray on the default background color for the cell. (Therefore, blocked programs in the past are indistinguishable from current blocked programs.)

FIG. 16

Express Guide-Package scrolling (2 of 2)

START (in past)

| Guide | | Titles | past | current |
|---|---|---|---|---|
| all express | | | | |
| express now | | | | |
| <now+30> | new | Matrix | 8:30p | 9:00p |
| <now+60> | new | Pushing Tin | 8:45p | 9:15p |
| <now+1:30> | overruled | Shakespeare in Love | 8:45p | 9:00p |
| d showcase | | | | |
| PPV | overruled | Bug's Life | 8:15p | 9:15p |
| mature | | | | |
| ○○○ | ✿ | Men in Black | 8:00p | 9:00p |
| | LAST! | The Boxer | 8:30p | 9:30p |
| | special | Will Smith Pack | — | Men in Black |
| 8:55a | special | Scorsese Subscription | — | one week |
| | special | | | |

Note that times in the past are indicated by displaying the time text in gray on the default background color for the cell. (Therefore, blocked programs in the past are indistinguishable from current blocked programs.)

RIGHT 1x

| Guide | | Titles | current | next |
|---|---|---|---|---|
| all express | | | | |
| express now | | | | |
| <now+30> | new | Matrix | 9:00p | 9:30p |
| <now+60> | new | Pushing Tin | 9:15p | 9:45p |
| <now+1:30> | overruled | Shakespeare in Love | 9:00p | 9:15p |
| d showcase | | | | |
| PPV | overruled | Bug's Life | 9:15p | 10:15p |
| mature | | | | |
| ○○○ | ✿ | Men in Black | 9:00p | 10:00p |
| | LAST! | The Boxer | 9:30p | — |
| | special | Will Smith Pack | Men in Black | Bad Boys |
| 8:55a | special | Scorsese Subscription | one week | two week |
| | special | | | |

Scroll RIGHT 2x

| Guide | | Titles | current | next |
|---|---|---|---|---|
| all express | | | | |
| express now | | | | |
| <now+30> | new | Matrix | 9:00p | 9:30p |
| <now+60> | new | Pushing Tin | 9:15p | 9:45p |
| <now+1:30> | overruled | Shakespeare in Love | 9:00p | 9:15p |
| d showcase | | | | |
| PPV | overruled | Bug's Life | 9:15p | 10:15p |
| mature | | | | |
| ○○○ | ✿ | Men in Black | 9:00p | 10:00p |
| | LAST! | The Boxer | 9:30p | — |
| | special | Will Smith Pack | Men in Black | Bad Boys |
| 8:55a | special | Scorsese Subscription | one week | two week |
| | special | | | | package in Lens START

| Guide | | Titles | choices | |
|---|---|---|---|---|
| all express | | | | |
| express now | | | | |
| <now+30> | overruled | Shakespeare in Love | 9:00p | 9:15p |
| <now+60> | overruled | Bug's Life | 9:15p | 10:15p |
| <now+1:30> | ✿ | Men in Black | 9:00p | 10:00p |
| d showcase | | | | |
| PPV | LAST! | The Boxer | 9:30p | — |
| mature | | | | |
| ○○○ | special | Will Smith Pack | Men in Black | Bad Boys |
| | special | Scorsese Subscription | one week | two week |
| 8:55p | new | Matrix | 9:30p | 10:00p |
| | new | Pushing Tin | 9:15p | 9:45p |

Scroll LEFT 1x

| Guide | | Titles | choices | |
|---|---|---|---|---|
| all express | | | | |
| express now | | | | |
| <now+30> | overruled | Shakespeare in Love | 8:45p | 9:00p |
| <now+60> | overruled | Bug's Life | 8:15p | 9:15p |
| <now+1:30> | ✿ | Men in Black | 8:00p | 9:00p |
| d showcase | | | | |
| PPV | LAST! | The Boxer | 8:30p | — |
| mature | | | | |
| ○○○ | special | Will Smith Pack | — | Men in Black |
| | special | Scorsese Subscription | — | one week |
| 8:55p | new | Matrix | 8:30p | 9:00p |
| | new | Pushing Tin | 8:45p | 9:15p |

Note. Packages do not display options in the past. If viewer scrolls left with a package in the Lens, the column displays a line (blank). Behavior with a package in the Lens is consistent with when times are in the Lens.

Past-to-Present Transition:
This flow describes the behavior when scrolling from past to current showtimes.
1. Starting in the past, the viewer scrolls right to get to the title.
2. The Lens "collapses," with only the title highlighted.
3. If the viewer scrolls right again, the Lens extends as usual.

FIG. 17

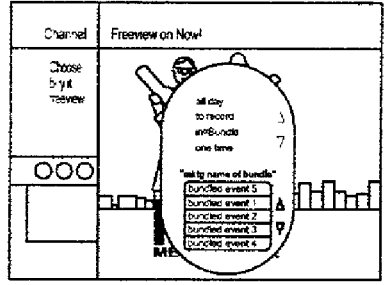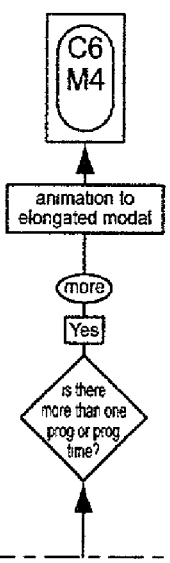
FIG. 25

TELEVISION PROGRAM DATABASE ARCHITECTURE

RELATED PRIORITY APPLICATIONS

The present application claims priority to U.S. Provisional Patent Application Ser. No. 60/284,399, filed Apr. 17, 2001, titled, "Television Program Database Architecture," which is hereby incorporated herein by reference in its entirety, and to U.S. Provisional Patent Application Ser. No. 60/283,921, filed Apr. 16, 2001, titled, "Interactive Television Navigation System," which is hereby incorporated herein by reference in its entirety.

RELATED APPLICATIONS

The present application is related to the following commonly owned applications:

application Ser. No. 09/103,317, filed Jun. 24, 1998, titled "Method and System for Providing User Interface for Electronic Program Guide;"

application Ser. No. 09/103,315, filed Jun. 24, 1998, titled "Method and System for Providing Selectable Programming in a Multi-Screen Mode;"

application Ser. No. 09/104,608, filed Jun. 24, 1998, titled "Method And System For Navigating Through Content In An Organized And Categorized Fashion;"

application Ser. No. 60/283,967, filed Apr. 16, 2001, titled "Method For Presenting Circular Dialog Windows;"

application Ser. No. 60/284,118, filed Apr. 16, 2001, titled "Complex Video and Data Service Scheduling Via URLs;"

application Ser. No. 60/284,117, filed Apr. 16, 2001, titled "Ranking of Unrated Content in Interactive Television Navigational System;"

application Ser. No. 60/284,141, filed Apr. 16, 2001, titled "Special Titles in Interactive Program Guide;" and application Ser. No. 60/283,968, filed Apr. 16, 2001, titled "Purchase Blocking Clarification and PPV Events in Television Multiscreen Browser;"

All of the above applications are hereby incorporated by reference in their entirety into this application.

BACKGROUND OF THE INVENTION

The invention relates generally to a television program database architecture, and more specifically, a database architecture which facilitates presentation of television programming based on a programming product presentation model.

In the early days of television, viewers were offered few channels and a limited number of programs. Indeed, over-the-air television broadcasting in any given region was, and still is, limited to only about half of the thirteen VHF channels and several UHF channels. With limited channels and programming, there was little need to present available programming in an organized or categorized manner, much less to provide a database structure for doing so.

The advent of cable and satellite television broadcast systems increased the number of channels being delivered. Presently, many programming providers, whether using cable, microwave, satellite, or the like, provide upwards of 60 to 100 channels of programming at any time. As with over-the-air broadcasting, the channels are arranged linearly in numeric order, e.g., from channel 1 through channel 99. Viewers change channels or "channel surf" by either moving from channel to channel in linear fashion or by selecting a specific channel by number and jumping directly from another channel to that channel.

Most systems provide video on demand (VOD) or near video on demand (NVOD) service to users of the systems. In VOD and NVOD systems, programming may be purchased by tuning into channels where particular programs are offered at various dates and times, or days of the week. The increased capacity of newer systems has provided the opportunity and need to offer a greater number and variety of VOD and NVOD programming of different types. Not only are there an increased number of programs offered, those programs are capable of being segregated into many different categories, such as situation comedies, dramas, game shows, and the like. Further, other types of specialized programming is beginning to be offered such as shopping programs wherein merchandise is offered for sale.

With the increased number of VOD and NVOD programs offered by cable and satellite systems, it becomes more difficult for viewers to identify the programming choices at any time by channel surfing. The time taken to move from channel to channel which offer programs for purchasing, to wait at each channel to determine what program is being offered and when, and decide whether to purchase the program seriously takes time in the aggregate. In addition, although program explanations are commonly offered on screen, it can nevertheless be difficult for the user to ascertain the type of program which the user is purchasing quickly.

New technological developments such as digital video and high definition television promise to dramatically increase the number of programs available for purchase on systems. Television broadcasting systems of the near future will likely have 500 or even 1000 programs available for purchase at any given time. Internet or on-line services provide even more potentially available content for distribution over television broadcast systems. Easy and efficient management of the multitude of programs which can be offered in these systems can be nearly impossible for content provides, broadcast system administrators, and the end users of the home television systems.

The problems described above associated with facilitating browsing through a more limited number of programs available will clearly become exponentially more serious, to the point where conventional systems for offering programming become unmanageable.

Thus, there is a need for a new system for organizing programs available for VOD or NVOD. The present invention provides such a system. Furthermore, with such a large quantity of programming content available to viewers, it is desirable to organize the content in a manner that provides a highly efficient structure for downloading and displaying available programming for selection and purchase by viewers. The broadcast systems content organized and presented to facilitate navigation through the content in an efficient and intuitive manner.

SUMMARY OF THE INVENTION

It is an object of the present invention to solve the deficiencies noted above in current television programming delivery and selection.

It is another object of the invention to provide a product selection database system advantageous for use with various types of data including on-line services over the Internet, kiosks or information booths, Internet browsers, as well as conventional television programming or movies. Such a database system facilitates an easy transition from today's limited viewing choices to the unlimited pallet of digital television, and facilitates development of set top box program selection systems which provide access to a maximum number of relevant program offerings.

It is another object of the present invention to provide viewers with new options for selection and purchase of programming products.

It is another object of the invention to provide viewers with option for selecting packaged programming suites.

It is another object of the present invention to provide the programming suites in both pre-packaged and customized formats.

In one embodiment, the invention provides a data structure for use with a computer application for selection of products containing presentable programming. The data structure includes: a product selectable through the computerized application; a link from the product to one or more program identifiers, such that the application can traverse the data structure to read the one or more program identifiers when the product is selected; and, one or more programs identified by the one or more program identifiers for presentation. The computerized application allows presentation of the one or more identified programs after selection of the product.

In another embodiment, the invention provides a computerized user-interactive system for facilitating allowing a user to select and be provided with a first product including a first set of one or more entities including at least one presentable program. The user-interactive system includes: a computerized navigational system for allowing the user to browse through representations associated with each of a plurality of selectable products, each of the plurality of selectable products including one or more presentable programs, and for allowing the user to select the first product from the plurality of selectable products; and, a database for storing information associating each of the plurality of selectable products with one or more entities deliverable to the user, the one or more entities deliverable to the user including one or more presentable programs. The database is accessible to facilitate providing the user with the first set of one or more entities of the first product.

BRIEF DESCRIPTION OF THE DRAWINGS

For a fuller understanding of the invention, reference is made to the following description taken in connection with the accompanying drawings, in which:

FIGS. 4A-4C is a flat table structure diagram with data records partially populated with pseudo data;

FIGS. 5A-5D show exemplary screen shots presented during a poster and product option selection process;

FIGS. 13-17 are simplified depictions of a graphical user interfaces according to one embodiment of the invention

FIGS. 19-29 depict small scale depictions series A of FIG. 18, and can be assembled in accordance with series A of FIG. 18.

DETAILED DESCRIPTION OF THE PREFERRED EMBODIMENTS

Figure 1:
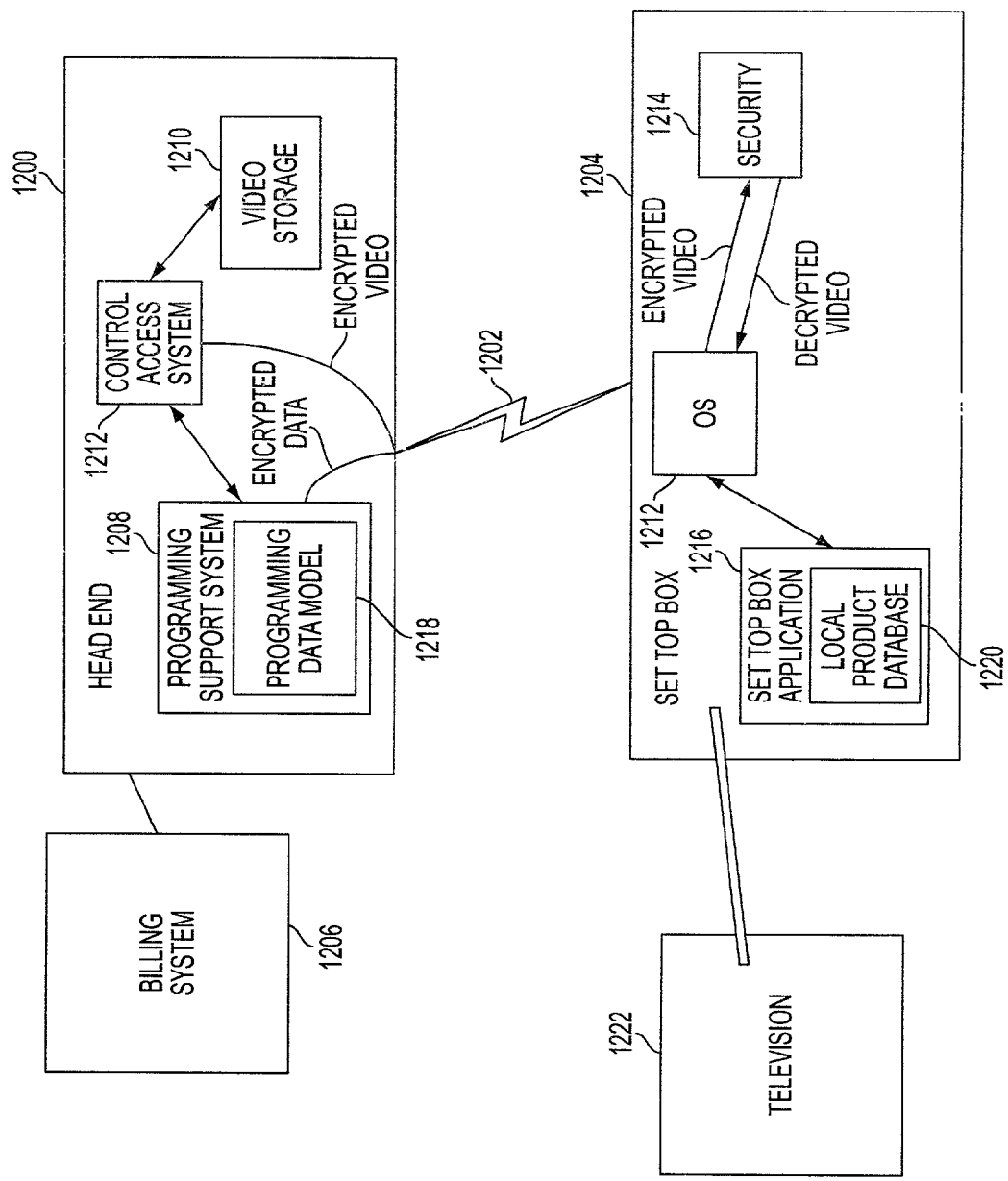
FIG. 1 is a block diagram representing an exemplary television delivery system for use with the present invention.

In some embodiments, the present invention provides a system and method for providing a product based architectural representation of programming data. Many embodiments of the present invention can be used in television programming delivery systems, but may be used for other systems such as on-line product merchandising systems and the like.

In some embodiments, a database record of the present system is comprised of a product based center. A Product has self contained pointers to other entities which are either offered with the product, or have options which link those other entities to the product. A pointer may link the product to a program for presenting on a television system. Either alternatively, or concurrently, another pointer may link the product to a merchandise item. Either alternatively, or concurrently, another pointer may link the product to a discount on merchandise, other programming, or to general programming service. Additionally, multiple entities may be pointed to as being associated with a particular product.

In some embodiments, the products available for purchasing by users of the system are associated with posters which are used for displaying product signage to facilitate selection of the products on the television screen. A poster table stores information in fields relating to signage and selection criteria for products.

In some embodiments, an option table stores records for directing viewing of, and selection of, products relating to a selected option. Option table works in relational manner with poster table in facilitating selection of a poster and its related options.

In some embodiments, an option to program/schedule mapping table is used to define relationships among several different tables in the database. The fields in the table are indexed fields for linking tables within the database schema.

In some embodiments, a program schedule table is provided for storing records for defining programs and their schedules which are offered as features of a product defined by the records described in the poster and option tables. The records are read by set top box program for display to a set top box user, and for selection of program start times on screen in relation to an option that the set top box user has selected.

In some embodiments, a marquee table is provided for storing program specific information common to all schedules for the particular program.

In some embodiments, a set top box application interfaces with the tables and table structure in order to present the user with a presentation of posters on a television system. The set top box application reads records from the poster table to represent posters and poster names as channels on screen. The application presents object linking and embedding graphic data stored in a poster graphic field in the poster table. Corresponding poster names are presented with the posters.

The table structure of the present invention generally facilitates automated processing of offers related to purchases products which may comprise other products, programs, discounts or merchandise, and even duplicate components of other products. An index is maintained in the option table for indicating related records which are pertinent, related to, or associated with the purchased product.

One embodiment of the present invention is compatible with a set top box navigational system as applied to television programming. While television programming is a preferred application of the present invention, all types of content are contemplated within the scope of the invention. For example, the present invention may be applied to content provided over the Internet by on-line services, other communication networks, in kiosks or other information booths, by Internet browsing software, etc.

A navigational system may be provided in which user choices are presented in a categorized and organized manner to facilitate navigation by viewers. The full set of available programming is organized into a number of product sectors, each of which represents some categorical class or business unit of programming, which correspond to the entries in a product sector field in the poster table. Examples of product sectors include adult, education, am movies, services, sports, games, and others. Each of the product sectors may have more particular sub-categories, or umbrellas of programming specific to that products sector. For example, the am movie product sector may be broken into umbrellas such as family, western, action, etc., each representing a type of program available in the product sector.

In addition to organizing programming into product sectors, the navigational system may provide a number of navigation tools to viewers. The navigation tools provide current or future programming choices to viewers through different user interfaces.

Figure 12:
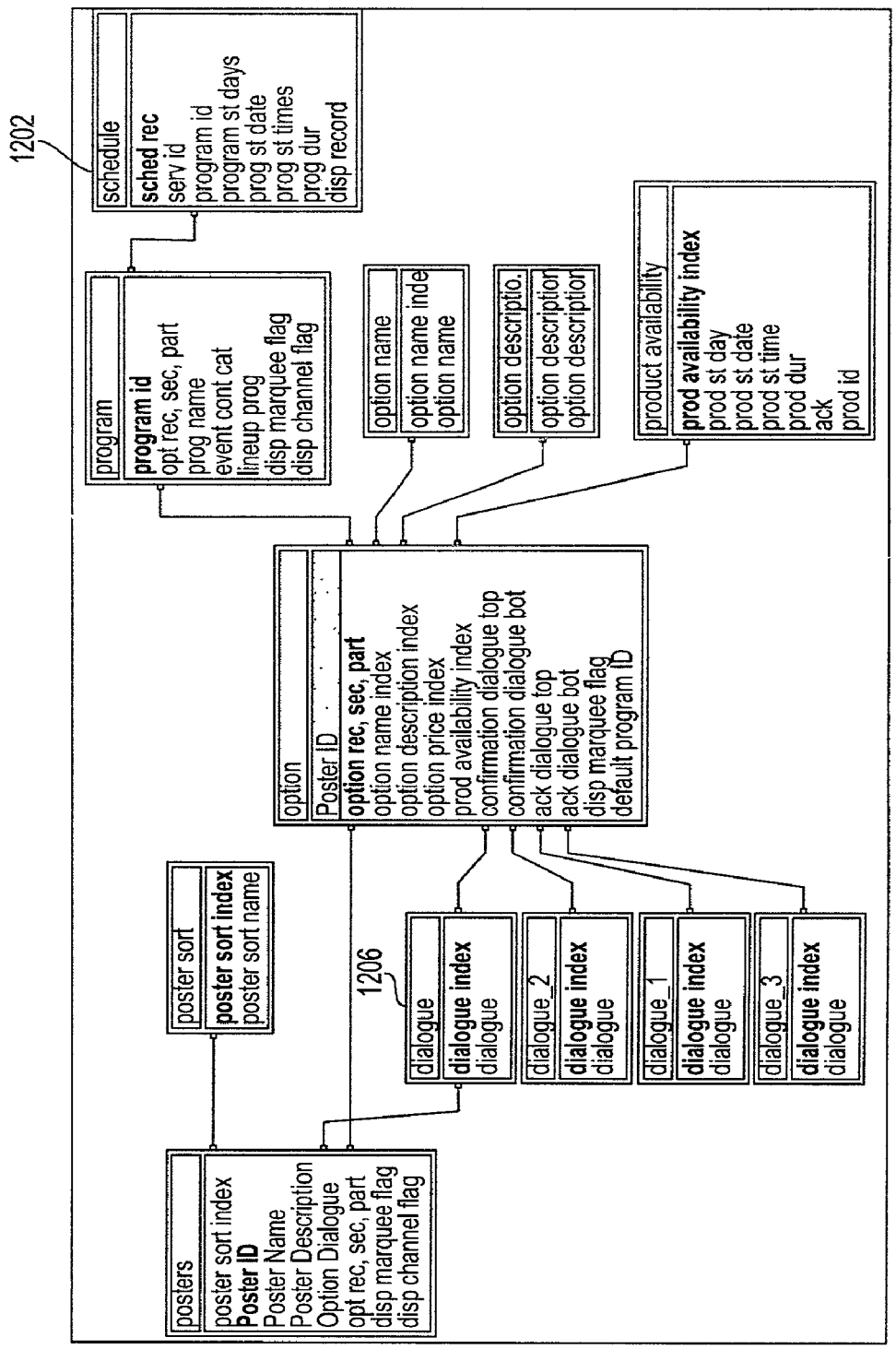
FIG. 12 depicts a schema for a dialogue table for one embodiment of express cinema data improvements.

One exemplary tool comprises a "GUIDE" tool for displaying and facilitating selection of programs in a categorized fashion. A screen grid is displayed on the television for providing direct program selection as an alternative to the poster selection. A guide or screen grid window provides an interactive display area for listing programs in various sorting orders. In some embodiments, the guide tool for Express Cinema, data improvements to which are depicted in FIG. 12, is based on marquees, whereas, in some embodiments, for television systems, the guide tool is based on programs.

In some embodiments, a pick menu displays available product sectors in local product database on the guide tool screen. The product sectors displayed in the pick menu are dynamically changing as a local product database in the set top box is updated from a head end system. The user may move a pick menu highlighter up and down pick menu to select the different product sectors available for display. As a different pick menu selection is highlighted, the related list of programming from the local product database is displayed.

In some embodiments, with the guide tool, the user may sort the individual programs by event content, time of day, date, or alphabetically. The structure of local product database facilitates different sorts in any tool applied to the programming data contained therein.

Other various navigation tools which can be provided to display poster and programs of the present invention. A tagging process may be used to mark selected programming for presenting when it is time for the programs to be shown. One skilled in the art would readily recognize that the tagging and presenting techniques could easily be employed to program records, merchandise records, games, and other selectable entitles of the present invention.

With reference to FIG. 1, a block diagram representing an exemplary television delivery system for use with the present invention is shown. The delivery system comprises a head end 1200, a distribution system 1202, and a set top box 1204 located at a subscriber location. The head end may also be linked to a billing system 1206 for recording order information and for producing periodic statements for subscribers of the system. Billing system 1206 may be compatible and used with billing systems specifically designed for television programming bill processing such as CSG TELEPHONY by CSG International Ltd. of Englewood, Colo.; or INTELE-CABLE, DDP/SQL, CABLEWORKS or CUSTIMA, each by CableData, Inc. of Rancho Cordova, Calif.

Head end 1200 may comprise a large multiprocessor computer architecture with shared random access memory, or may comprise several smaller computer modules comprising a local distributed processing system for housing the various components of head end 1200. One of the components of head end is a video storage device 1210 comprising video formats such as MPEG, MPEG-2, DVD, VCR or other standard video formats. Viewer access is controlled by a control access system 1212 which receives commands for encrypting video for transmitting through transmission system 1202 to set top box 1204. The encrypted video signals are routed through part of an operating system 1212 within set top box 1204, which routs the encrypted video system through to a security system 1214 which is controlled by operating system 1212.

Transmission system 1202 may be direct dish-to-dish microwave, cable, satellite or other transmission media known to those of skill in the art.

Head end system 1200 converts analog television programming into compressed digital information suitable for transmission in accordance with techniques known to those of skill in the art. The digital video information, which may be in MPEG format, is transmitted as digital channels, with multiple digital channels being transmitted in a single tunable frequency band. Set top box 1204 can tune to one of the frequency bands and includes circuitry for digital video decoding, including a demultiplexer, processor, and MPEG and graphics overlay processor and memory chips. Set top box 1204 is designed to perform digital video decoding and to support the functionality of the present invention, and is available from Zenith Electronics Corporation of Glenview, Ill. and DiviCom Inc. of Milpitas, Calif. Data is transmitted in the frequency bands, such as the database information described below. The database information of the present invention may used to support tools such as an intelligent program guide tool, described in greater detail below.

Transmission system 1202 provides a means for transmission of signals from set top box 1204 to head end 1200. The means may include one or more back channels in a cable system to transmit intermittent bursts of information from set top box 1204 to head end 1204, a telephone link from set top box 1204 to head end 1200, or, in a wireless broadcast system, a transmitter in set top box 1204 to wirelessly transmit information back to head end 1204. The two way communication facilitates an array of services to be provided, such as video on demand, purchasing of products shown on television 1222, etc. Additional embodiments of a two way system may become practicable as developments are made in the art.

The system can be used to provide television programming, including standard and premium television channels, movies, pay-per-view events and NVOD through separate channels. However, content other than video may also be provided. For example, the system may be adapted to transmit pages of any kind of text, picture and other multimedia elements encoded as hypertext markup language (HTML) data with accompanying files such that world wide web-like pages can be delivered to television 1222.

Several navigation tools may provide an interactive interface which allows viewers to select posters defining products, programs or channels for immediate or later viewing. The system be may compatible with, and combined to work with, third party near video on demand (NVOD) systems such as DYNAMO DEJA VU by Viewgraphics Inc. of Mountain View, Calif., or NSTREAMS MEDIA SERVER by nStreams Technologies, Inc. of Santa Clara, Calif. In systems that are integrated with third party NVODs, components 1210, 1212 and 1214 facilitate the compatibility by interfacing directly with such third party NVODs, and is controlled by the navigation tools within set top box 1216 which resides within set top box 1204.

Within head end 1200, a programming support system 1208 contains software that communicates electrically and through communication system 1202 with set top box application 1216. Programming support system 1208 contains a programming data model 1218 which contains continuously updated television programming data. Programming support system 1208 reads the updated data and periodically reads programming data model 1218, encrypts the read data, and forwards the encrypted data to set top box 1204. Set top box application 1216 captures the encrypted data, decrypts it, and stores the encrypted data in a local product database 1220 within set top box application 1216, explained bellow, for storing product and programming information for user selection via the set top box application. In some embodiments of the invention, video data is encrypted, whereas programming data is compressed.

Television 1222 is electrically connected by standard television cable to set top box 1204.

Figure 2:
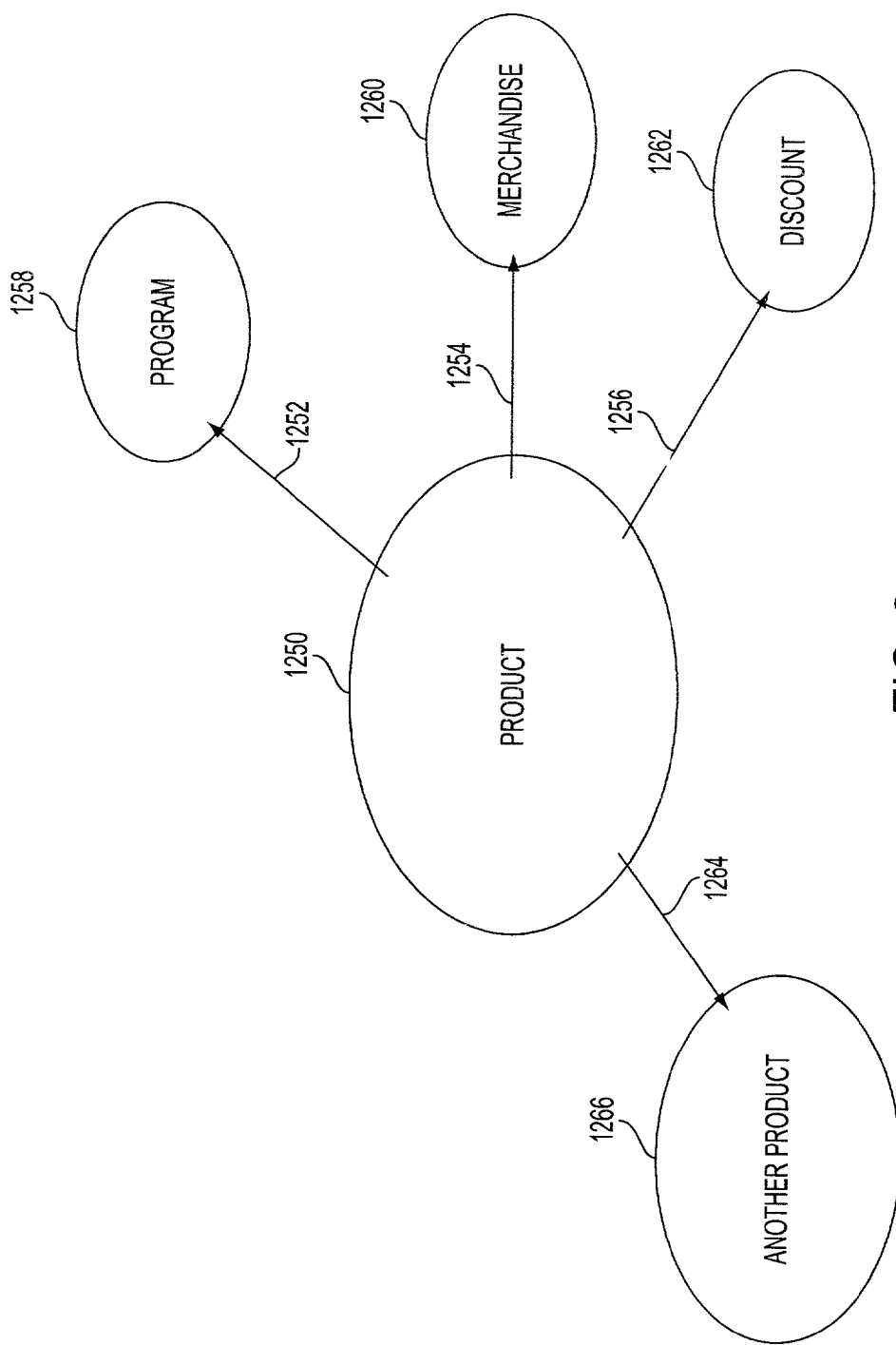
FIG. 2 is a conceptual diagram of the basic entities of the present invention.

With reference to FIG. 2, a conceptual diagram of the basic entities of the present invention is shown. The system of the present invention is a product based architectural representation of programming data. Many embodiments of the present invention can be used in television programming delivery systems, but may be used for other systems such as on-line product merchandising systems and the like.

A relational database record of the present system is conceptually comprised of a product based center 1250. Product 1250 has self contained pointers 1252-1256 to other entities 1258-1262 which are either offered with product 1250, or have options which link those other entities 1258-1262 to product 1250. Pointer 1252 may link product 1250 to a program 1258. Either alternatively, or concurrently, another pointer 1254 may link product 1250 to a merchandise item 1260. Either alternatively, or concurrently, another pointer 1262 may link product 1250 to a discount 1262 on merchandise, other programming, or to general programming service. Further, either alternatively, or concurrently, another pointer 1264 may link product 1250 to yet another product 1266.

Figure 3:
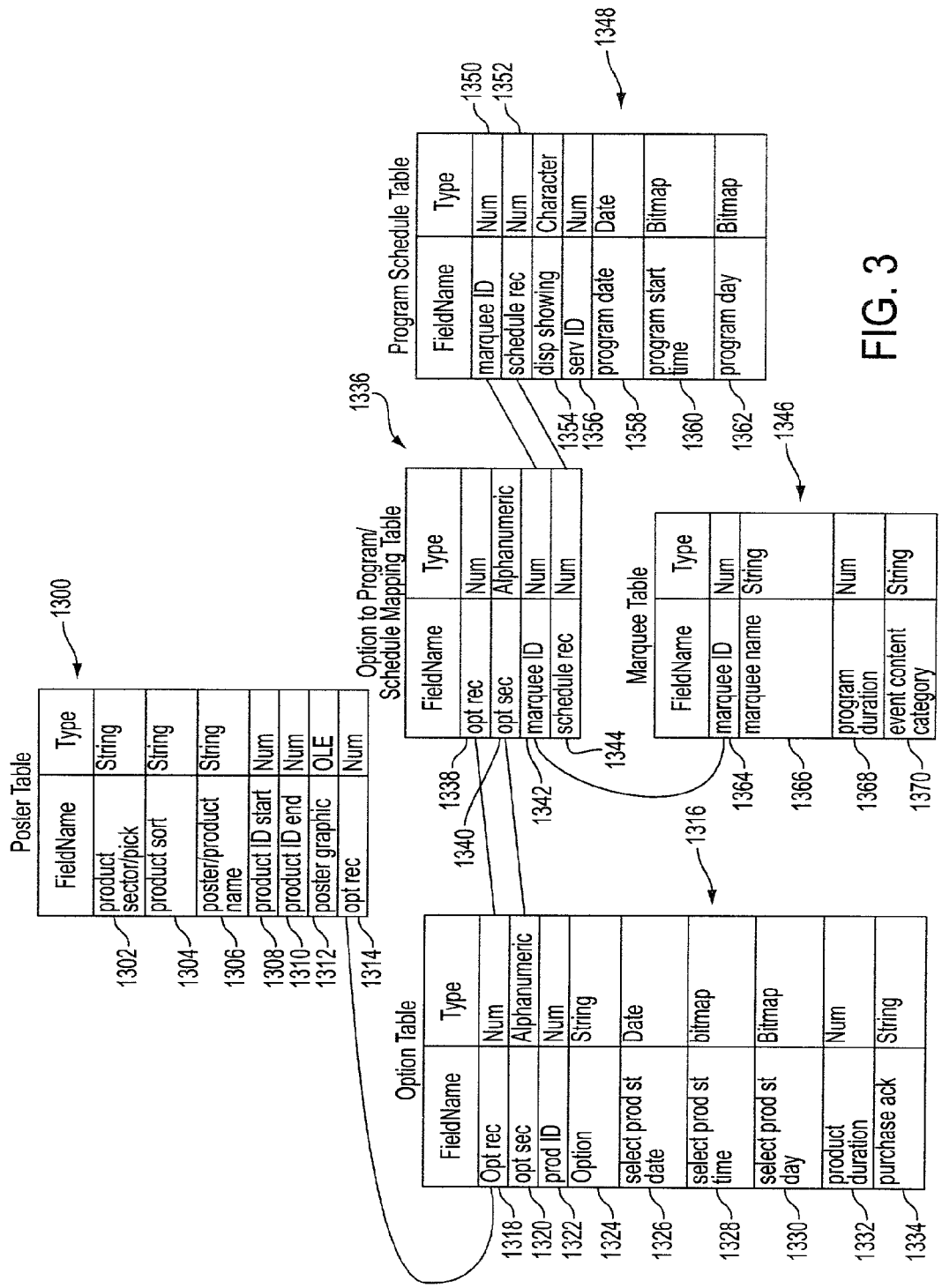
FIG. 3 is a diagram showing a database schema representing the table structures and structural relationships of the tables of an embodiment of the present invention.

With reference to FIG. 3, a database schema for an embodiment of the present invention is shown. The products available for purchasing by users of set top box 1204 (FIG. 1) are associated with posters which are used for displaying product signage to facilitate selection of the products on the television screen. A poster table 1300 stores information in fields relating to signage and selection criteria for products. A product sector/pick field 1302 stores an index used for sorting posters in a logical fashion. Exemplary entries in product sector/pick field 1302 include educational, am movies and sports. Product sector/pick field 1302 may include string entries, but alternatively may include numbered indexed entries which can be related to a product sector table containing descriptions of the entries. As explained below, field 1302 may be used to sort poster records in an on-screen pick menu which is used for providing dynamically changing programming categories of products on screen.

A product sort field 1304 stores a secondary index used for sub-sorting posters in a logical fashion. Exemplary entries for product sort field 1304 under a product sector/pick entry educational might comprise cuisine, ed/si-after school, ed/si-fitness or ed/si-hobbies. Product sort field 1304 may include string entries, but alternatively may include numbered indexed entries which can be related to a product sort table containing descriptions of the entries.

A poster/product name field 1306 stores the name of the poster for display during on-screen selection. Exemplary entries for poster/product name field 1306 include Free Movie With Little Mermaid, Disney Showcase Parent Trap or Men In Black. Field 1306 comprises string entries.

A product ID start field 1308 stores the first of a series of sequential sub product identification numbers stored in a product option table described below.

A product ID end field 1310 stores the last of a series of sequential sub product identification numbers stored in a product option table described below.

A poster graphic field 1312 stores an (object linking and embedding) OLE object comprising a poster which is displayed on screen to a set top box user during selection of products.

An option record field 1314 stores a key reference number for relating the poster record in relationship to records in an option table described below.

An option table 1316 stores records for directing operation of viewing of, and selection of, options relating to a selected product. Option table 1316 works in relational manner with poster table 1300 in facilitating selection of a poster and its related options.

Opt rec field 1318 stores an index record for an option table record. Opt rec field 1318 forms a relationship with opt rec field 1314 in poster table 1300.

An opt sec field 1320 is an alphanumeric secondary index for option table 1316. Typical value masks for opt sec field may comprise members of the set:

(NA, NNA, NAA, NNAA, NNNAAA)

wherein N represents a decimal number from 0-9 inclusive, and A represents an character value from a-z inclusive. Opt sec field 1320 has at least a dual purpose. One purpose is to serve as a secondary index in the relationship with product table 1300. Another purpose of opt sec field 1320 comprises directing set top box application 1216 in displaying and selection of options as explained below with reference to FIGS. 4A-C.

Alternatively, field 1320 may be split into two different fields, one field for storing the numeric portion, and the second for storing the character value.

A prod ID field 1322 stores a number representing a product identification number. As noted above, field 1322 defines a sequential order of available products related to a poster defined by records in poster table 1300. Fields 1308 and 1310 in poster table 1300 track the first available prod ID and the last available prod ID stored in field 1322 in option table 1316. Prod ID field 1322 defines a unique identification number.

One exemplary sequence defined by prod ID field 1322 may comprise a range of numbers for NVOD start times for the product wherein the numbers correspond to, for example, hourly start times through a one week period that the product may be offered. In this case, the options defined by prod ID would account for 12 products per day times 7 days which would equal 84 different records in option table 1316 accounting for the different start times during the week. Alternatively, a product may only be offered for one day with different start times on the half hour, in which case there might be 24 different records accounting for the different start times, each record having a different prod ID entry in field 1322. Alternatively, the different records with different prod ID entries in field 1322 may define different products for the related poster record in table 1300, or a mix of different types and times of products.

A select prod st date field 1326 stores the start date of the product. This field may or may not be application depending on the particular product defined by the record. For example, if the product relates to merchandise, or a discount off a monthly statement, then field 1326 may not be relevant and could be blank. However, given that the majority of products offered relate to television programs or movies, the value in field 1326 is relevant and non-blank in most cases. Field 1326 is in year 2000 compliant American date format and may have the following mask:

MM/DD/YYYY wherein MM represents a decimal value indicating the month of the year, DD represents a decimal value indicating the day of the month, and YYYY represents a decimal value representing the year. Alternatively, the date may be in julian format wherein the representation of month and day is by a consecutive number starting with Jan. 1 with a separate field for the year value.

A select prod st time field 1328 is used for storing a value for defining the start time of the product, if relevant to the define product. The product start time may be in bitmap format, with 6 significant bits, wherein each sequential value in binary format represents a 15 minute interval in a 24 hour period, starting from 6:00 am, and ending 5:45 am the next morning. Set top box 1216 has a conversion table which converts bitmap format to time format. The following is a partial illustration of the conversion table:

| | |
|---|---|
| 000001 | 6:00 am |
| 000011 | 6:15 am |
| 000010 | 6:30 am |
| ... | |
| ... | |
| ... | |
| 101110 | 5:15 am next day |
| 101111 | 5:30 am next day |
| 110000 | 5:45 am next day |

A select prod st day field 1330 is used for storing a 4 bit binary value, or bitmap, for representing a start day of the week for the product. Although this value can be calculated by set top box application 1216 from select prod st date field 1326, storing the day in bitmap form may speed processing. Alternatively, select prod st date field 1326 may be left blank with field 1330 assigned a value for a product which is offered indefinitely for one day a week. Set top box application 1216 may use the following conversion table for calculating the value of field 1330 to the day of the week:

| | |
|---|---|
| 0001 | Sunday |
| 0010 | Monday |
| 0011 | Tuesday |
| 0100 | Wednesday |
| 0101 | Thursday |
| 0111 | Friday |
| 1000 | Saturday |

A product duration field 1332 is a numeric field used for storing the time duration, if applicable, for a product.

A purchase ack field 1334 is a string field used for storing an acknowledgement message for display when purchase of the product is completed.

An option to program/schedule mapping table 1336 is used to define relationships among several different tables in the database. The fields in the table are indexed fields for linking tables within the database schema.

An opt rec field 1338 is a numeric field used for linking table 1336 to option table 1316.

An opt sec field 1340 is an alphanumeric field used for linking table 1336 to option table 1316.

A marquee ID field 1342 is a numeric field used for linking table 1336 to a marquee table 1346 and a program schedule table 1348, both explained below.

A schedule rec field 1344 is a numeric field used for linking table 1336 to program schedule table 1348.

The program schedule table 1348 is a table containing records for defining programs and their schedules which are offered as features of a product defined by the records described in tables 1300 and 1316 described above. The records are read by set top box program 1216 for display to a set top box user, and for selection of program start times on screen in relation to a product that the set top box user has selected.

A marquee ID field 1350 is a numeric field used for uniquely identifying a program. Marquee ID field 1350 serves as an index for linking table 1348 to table 1336.

A schedule rec field 1352 is a numeric field used for uniquely identifying a schedule records for a program.

A display showing field 1354 is a boolean field used to indicate whether a record from table 1348 should be used for display to a user in a few unique situations during operation of set top box application 1216. One exemplary instance where this field is used is in the case wherein a user wishes to display a list of programs and start times for selection without purchasing a full product which the program is a part of. With the multitude of available program selection records which may be present in table 1348 for relation to products, some schedule information may have the same schedule times for the same program as other records. For these few situations, one record is selected for display while the other is not used when displaying program schedule information separate from the product information. For the record which is not to be displayed, a "no" boolean entry is used to indicate to set top box application 1216 that program schedule information for that record should not be displayed in the program schedule.

A serv ID field 1356 is a numeric field used for storing a television channel that the program will be broadcast on if the user purchases the program or a product containing the program.

A program date field 1358 stores the start date of a program. Within each product offered, there may be several programs, and several program start times, which a set top box user may select. These programs may be offered at different dates, times or once a week. Field 1358 is for storing the date of a program offered, and may have a blank value if the program is offered on a weekly basis, or at the same time on a daily basis. Field 1358 is in year 2000 compliant American date format and may have the following mask:

MM/DD/YYYY wherein MM represents a decimal value indicating the month of the year, DD represents a decimal value indicating the day of the month, and YYYY represents a decimal value representing the year. Alternatively, the date may be in julian format wherein the representation of month and day is by a consecutive number starting with Jan. 1 with a separate field for the year value.

A program start time field 1362 is used for storing a value for defining the start time of the program. The program start time may be in bitmap format, with 6 significant bits, wherein each sequential value in binary format represents a 15 minute interval in a 24 hour period, starting from 6:00 am, and ending 5:45 am the next morning. Set top box application 1216 has a conversion table which converts bitmap format to time format. The following is a partial illustration of the conversion table:

| | |
|---|---|
| 000001 | 6:00 am |
| 000011 | 6:15 am |
| 000010 | 6:30 am |
| ... | |
| ... | |
| ... | |
| 101110 | 5:15 am next day |
| 101111 | 5:30 am next day |
| 110000 | 5:45 am next day |

A program start day field 1362 is used for storing a 4 bit binary value, or bitmap, for representing a start day of the week for the product. Although this value can be calculated by set top box application 1216 from program date field 1358, storing the day in bitmap form may speed processing. Alternatively, program date field 1358 may be blank with field 1362 assigned a value for a product which is offered indefinitely for one day a week. Set top box application 1216 may use the following conversion table for calculating the value of field 1358 to the day of the week:

| | |
|---|---|
| 0001 | Sunday |
| 0010 | Monday |
| 0011 | Tuesday |
| 0100 | Wednesday |
| 0101 | Thursday |
| 0111 | Friday |
| 1000 | Saturday |

A marquee table 1346 is used for storing program specific information common to all schedules for the particular program.

A marquee ID field 1364 is a numeric field used for storing a program identifier, and is used as an index for relating marquee table 1346 to option to program/schedule mapping table 1344.

A marquee name field 1366 is a string field used for storing the name of the program.

A program duration field 1368 is a numeric field used for storing the duration of a program in minutes.

An event content category field 1370 is a string field used as a sort index and display field for describing the content of a program.

Figure 4A:
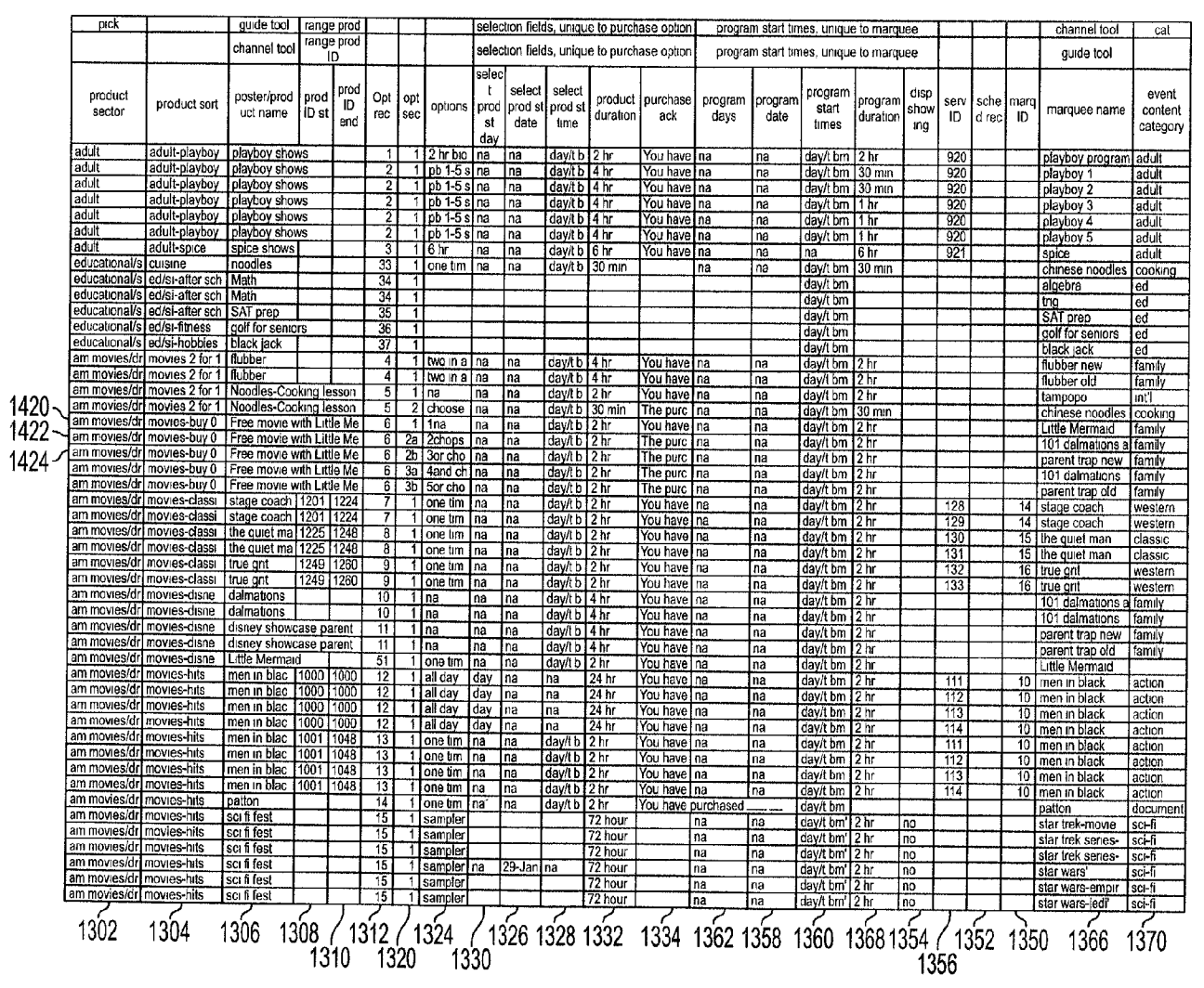

With reference to FIGS. 4A-4C, a continuous partial field listing is illustrated with partial pseudo data entered. The data fields are listed in de-normalized form for illustrative purposes. The corresponding fields have like reference numbers with those similarly described in FIG. 3.

FIGS. 5A-5D illustrate an exemplary series of product selection screens.

Figure 5A:
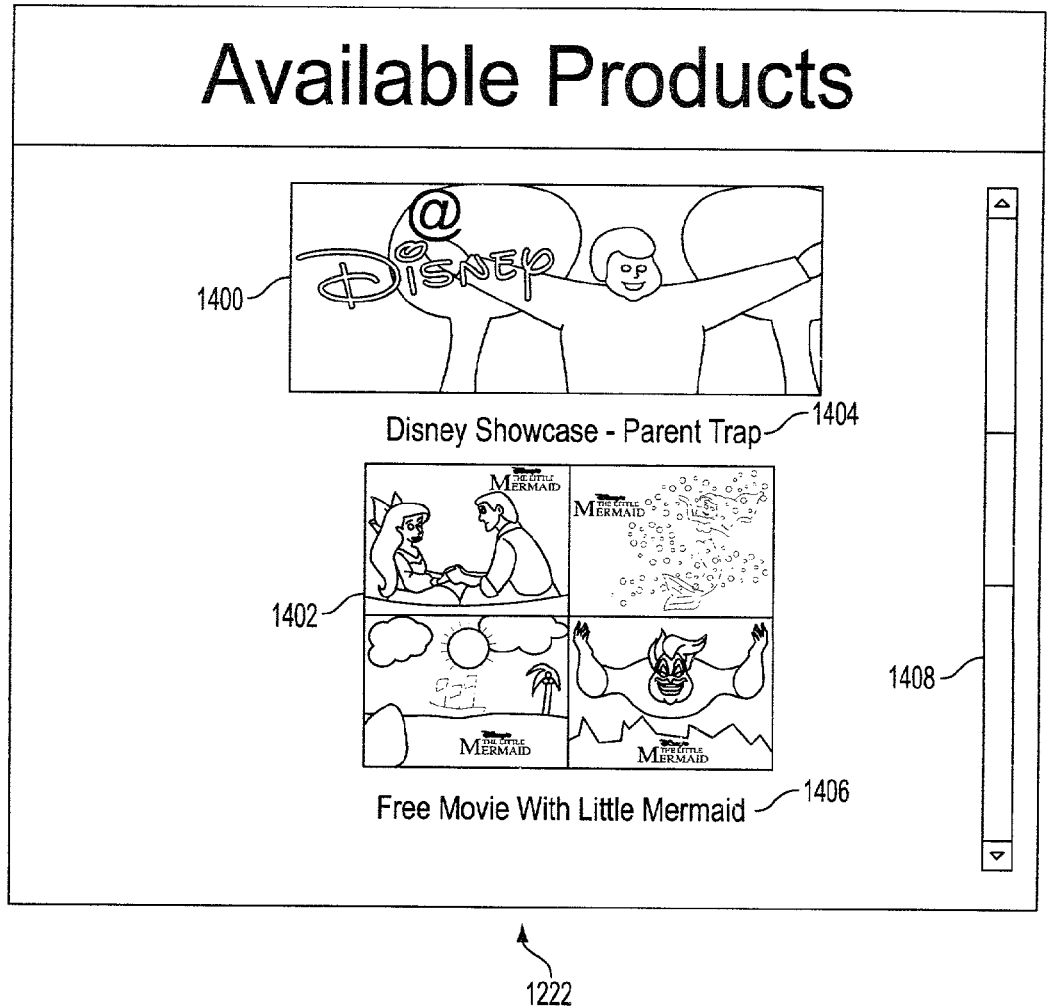

With reference to FIG. 5A, set top box application 1216 (FIG. 1) presents the user with a selection listing of posters on television system 1222. Set top box application 1216 reads records from poster table 1300 (FIG. 3) to present posters and poster names on screen. Application 1216 presents OLE objects stored in poster graphic field 1312 as indicated at 1400-1402. The corresponding poster names 1404 and 1406 are presented with posters 1400-1402. A standard graphical user interface (GUI) slider bar may be used for selection between products.

Figure 5B:
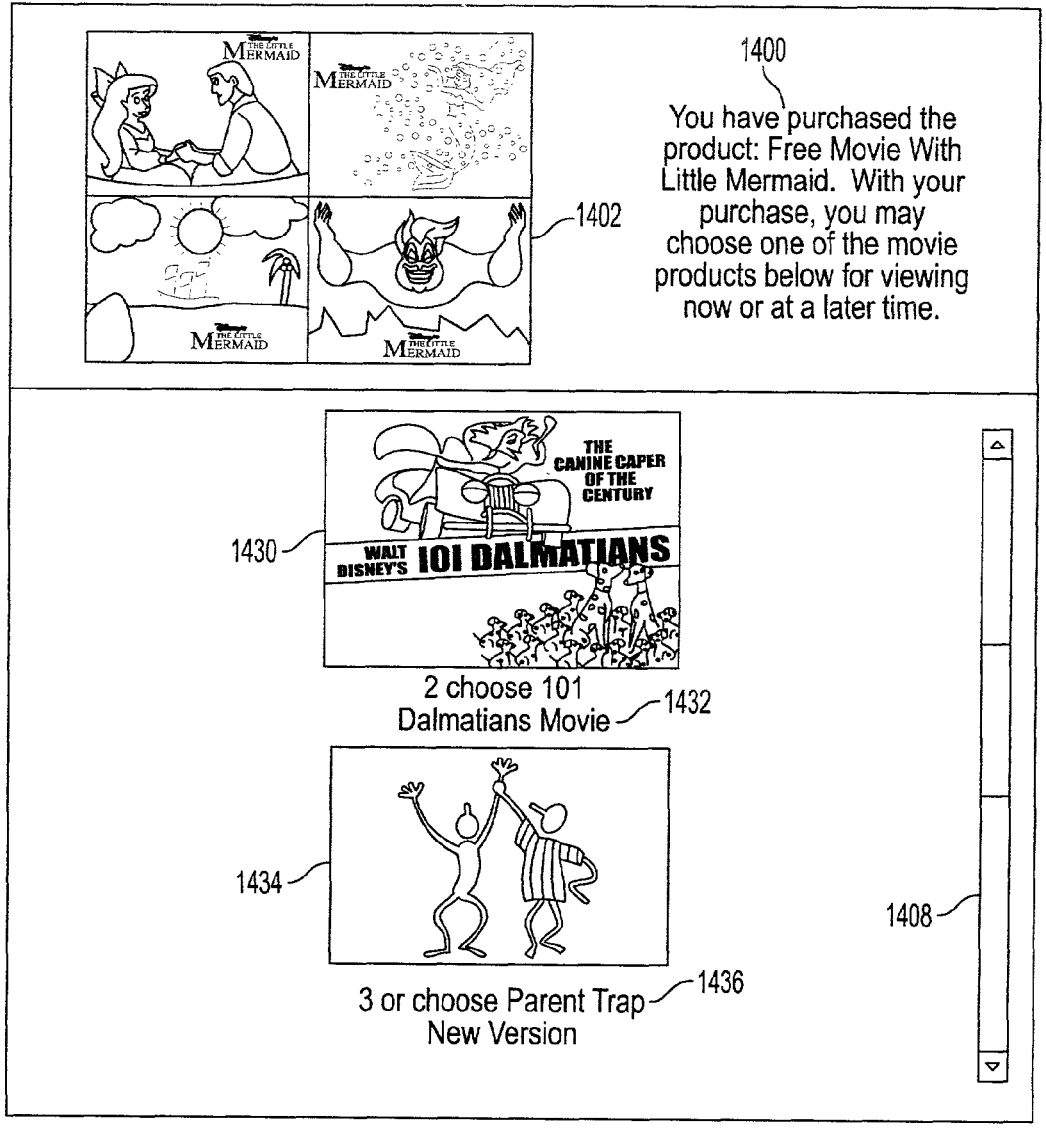

With reference to FIG. 5B, the user of set top box 1216 has selected poster 1402 to choose the poster with poster name 1406. Poster 1402 has been re-displayed at the top of television 1222. Adjacent poster 1402, set top box application takes poster name 1406 and integrates it into a standard acknowledgment message to the user of set top box 1216.

With reference again to FIG. 4A, lines 1420-1424 indicate the records which have been read from tables 1300 and 1316 for displaying options as shown in FIG. 5B. Line 1420 indicates the pseudo field values for displaying poster 1402 for selection by the user of set top box 1204. Once poster 1402 has been selected, set top box application 1216 reads the related records in option table 1316 to display the available options under the product defined by the data in line 1420. As indicated by line 1422, another product is associated with line 1420 giving the user the option to watch the movie 101 Dalmatians in addition to The Little Mermaid. This first option is indexed as 2a in opt sec field 1320. The poster table for option 2a is read, and the poster for 101 Dalmatians is displayed, as indicated at 1430. String value 1432 in option field 1324 related to option 2a is displayed below poster 1430.

Similarly, set top box application 1216 continues displaying option records as with the records providing data indicated in line 1422. Line 1424 indicates further data as read from field 1430 and the related poster table records for that particular option identified by the value of 2b in opt sec field 1320. Set top box 1216 uses the data from line 1424 to produce display output 1434 and 1436 for selection.

Figure 5C:
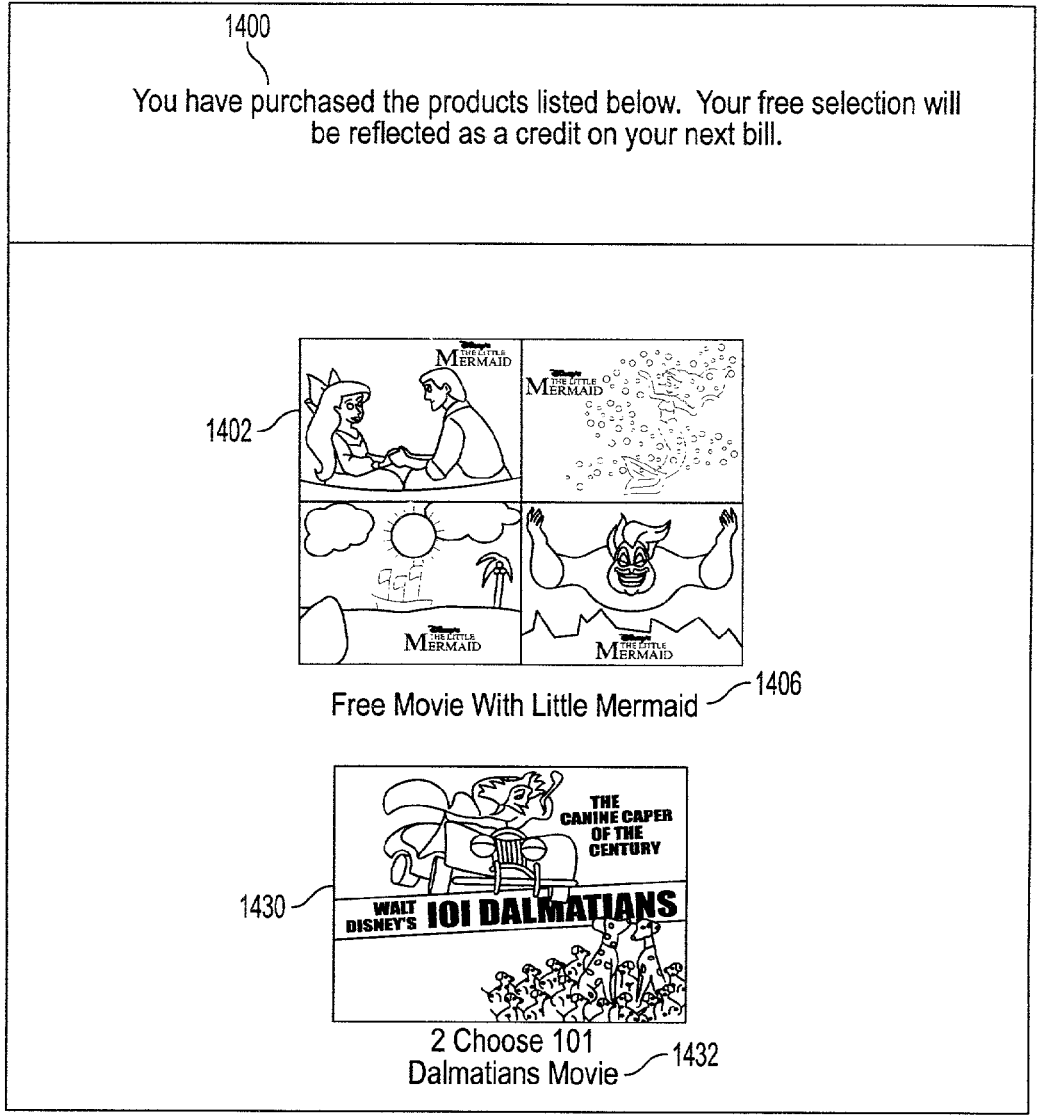

With reference to FIG. 5C, after the user has completed selection of products and options, an acknowledgment screen is displayed on television 1222. Acknowledgment text is read from purchase ack field 1334 and displayed as indicated at 1460. Further, as part of the acknowledgment message, display items 1402, 1406, 1430 and 1432 are re-displayed to the user.

With reference to FIG. 5D, the user is then presented with a selection list, on screen, of dates and times on screen for selection of all of the movies related to the options and products which have been selected for the particular purchase. A first column displays start time selections for the next earliest date that the selected programs are broadcast. A second column 1440 displays start time selections for a next date, if available, after the earliest date displayed. A prompt 1442 displays a message containing selection instructions. Selected programming times may be stored using a tagging method and system as described in application Ser. No. 09/103,316 incorporated by reference above.

Figure 6A:
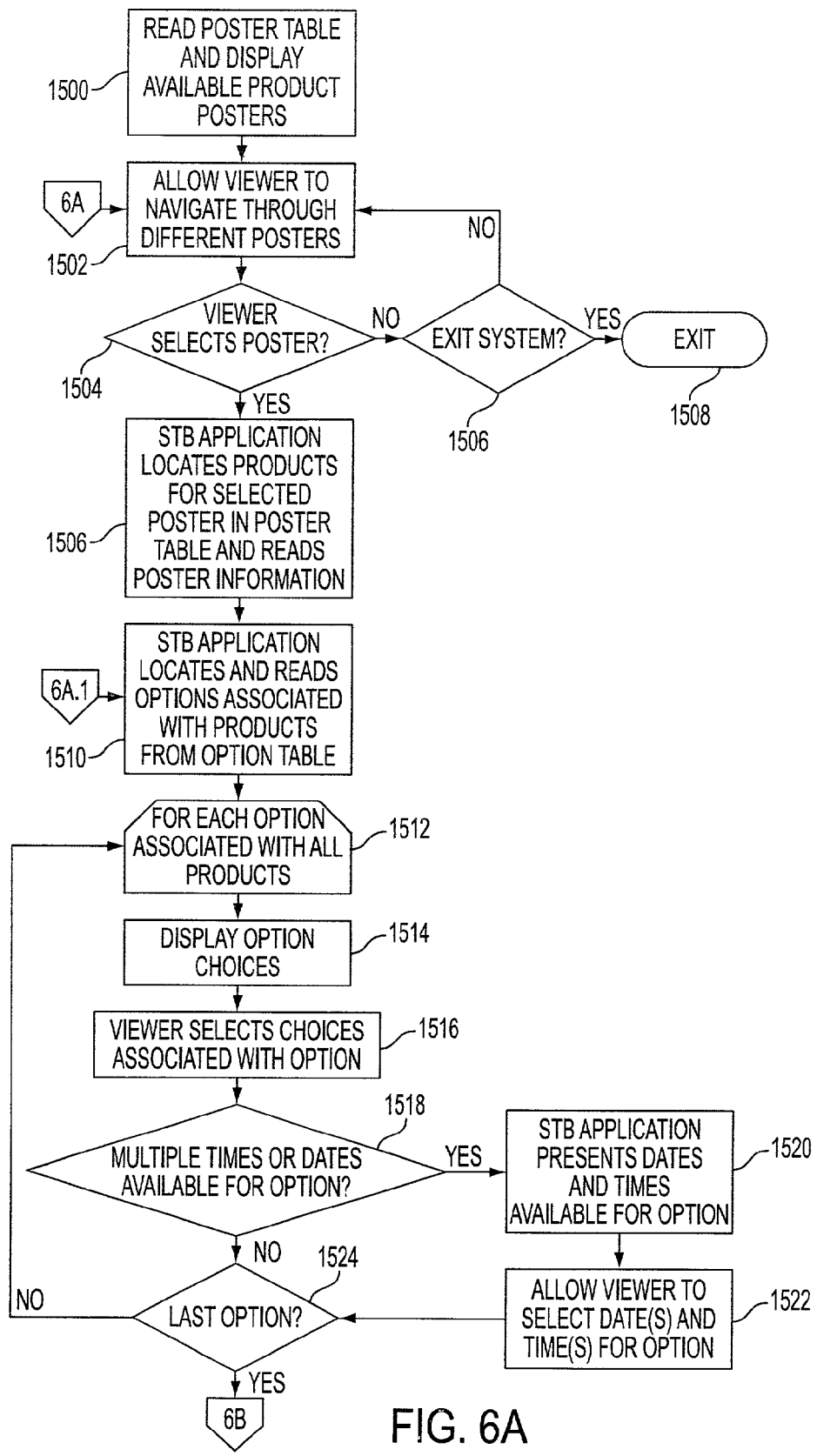
FIGS. 6A-6C are flow diagrams showing the process for selecting a poster and related product options.
Figure 6B:
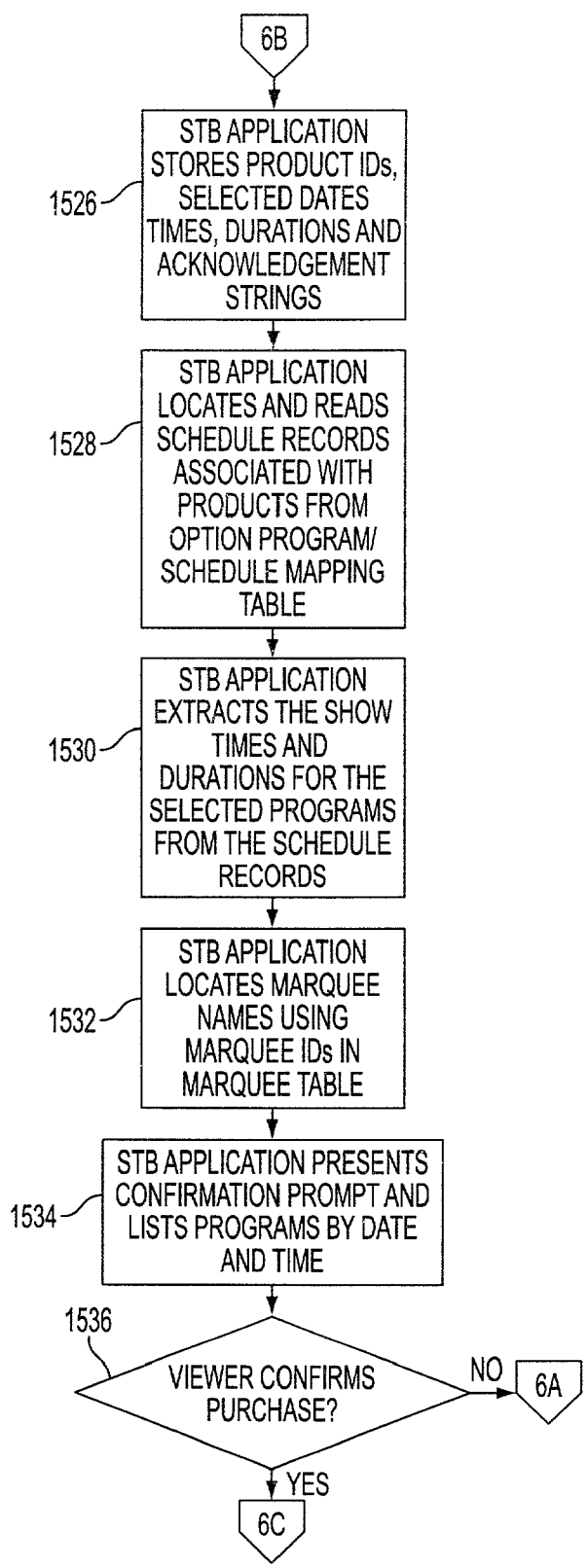

FIGS. 6A-6B are a series flow diagrams illustrating set top box application 1216 operations for the product selection process.

With reference to FIG. 6A, starting with step 1500, application 1500 reads the poster table to display the available product posters for user selection.

In step 1502, the user is allowed to navigate or browse through the various posters available. Throughout poster navigation, application 1216 checks for selection of one of the posters, step 1504. Also, application 1216 checks to see if the user provided an exit command to end browsing, step 1506. If the exit command was initiated, the system exits the poster selection routine, step 1508. If neither a poster is chosen, or an exit command is given, processing returns to step 1502.

If a poster is selected, application 1216 then locates products for the selected poster in poster table 1300 and reads the poster information contained therein as described above. Using the relation created through opt rec field 1314, application 1216 locates and reads all options associated with all products related to the selected poster from option table 1316, step 1510.

Application 1216 sets a loop to visit all option records associated with the products of the selected poster, step 1512. Next, application 1216 displays the choices for the option being processed as described above in relation to FIGS. 5A-5C, step 1514. The viewer is then given the ability to select the choices associated with the option, step 1516.

Application 1216 uses the relationship established between option table 1316 and program schedule table 1348 through option to program/schedule mapping table 1336 for multiple times offered for the particular option being visited by the loop, step 1518. If multiple dates are available, application 1216 presents dates and times available for the option, step 1520. The viewer is given the ability to select a date and time for the option, step 1522.

The loop routine of application 1216 checks to see if the last option has been processed, step 1524. If the last option has not been processed, then processing moves back to 1512.

With reference to FIG. 6B, application 1216 stores product IDs read from field 1322 for the selected poster, selected dates, times, durations read from field 1332, and acknowledgment strings read from field 1334, step 1526.

Application 1216 then locates and reads schedule records associated with the selected products from option the program/schedule mapping table, step 1528. Show times and durations for the related programs are extracted from the schedule records, step 1530.

Through the relationship established between option table 1316 and the marquee table 1346 using option to program/schedule mapping table 1344, application 1216 locates marquee names using marquee ID values from field 1364 in marquee table 1346, step 1532.

Application 1216 presents confirmation prompt 1460 (FIG. 5C) and lists all available programs for the products by date and time, step 1354. The user may then confirm or cancel the purchase, step 1356. If the user cancels the order, then processing moves back to step 1502 (FIG. 6A). Otherwise, the order process continues.

Figure 6C:
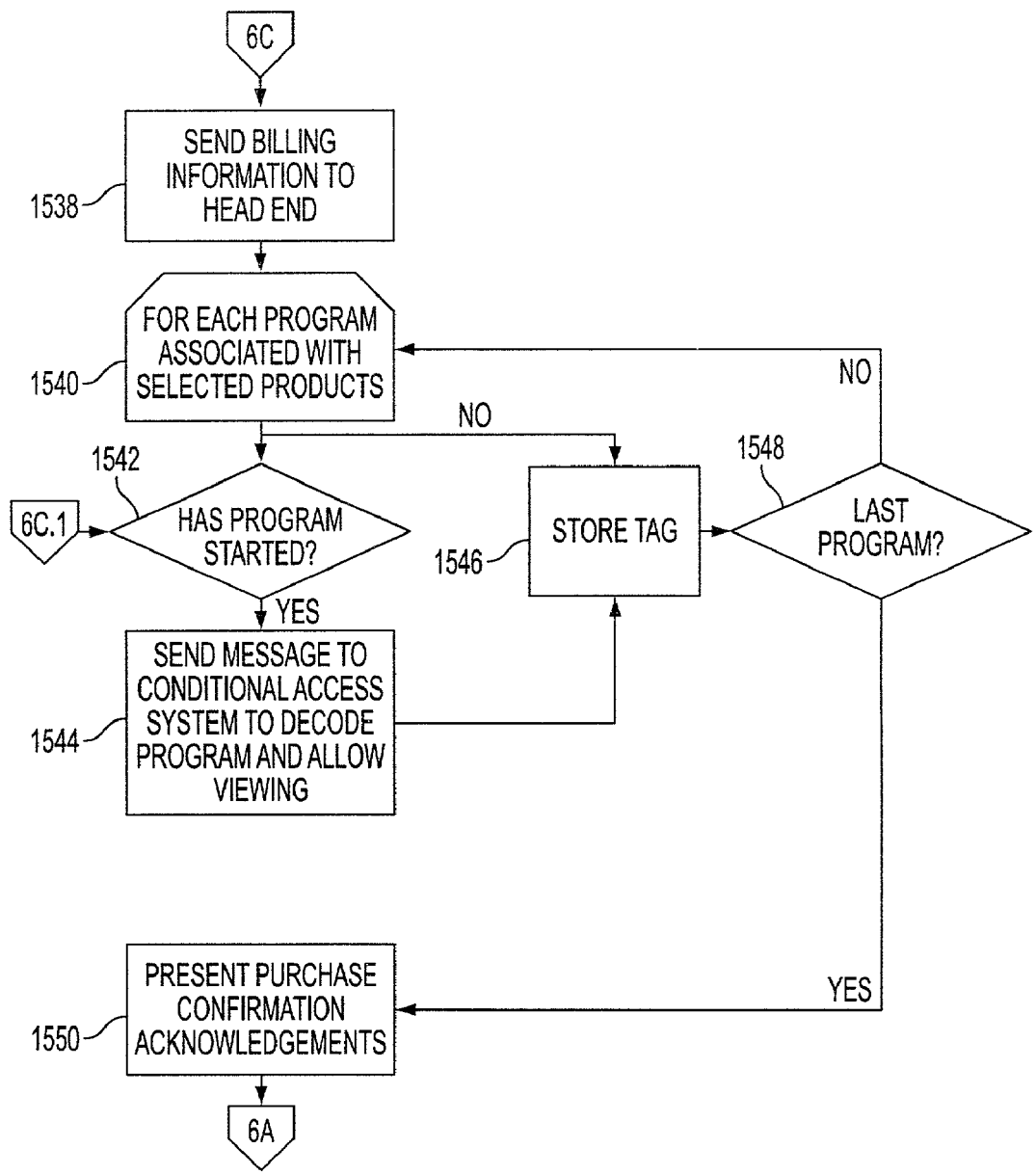

With reference to FIG. 6C, billing information is sent to head end 1200, which forwards the billing information to billing system 1206, step 1538.

Application 1216 sets a loop to visit all programs associated with the selected products, step 1540. Application 1216 first checks to see if the program is currently being aired, step 1542. If the program is currently being aired, then application 1216 sends a message to conditional access system to decode the program and allow viewing, step 1544. A program tag is then set in the memory for set top box application 1216 which tells the system that access should be allowed for the program throughout the duration of the program, step 1546.

If the program is not currently being aired, the program tag is set in step 1546. After step 1546, application 1216 checks if the last program has been processed, step 1548. If there are more programs to process within the selection, processing returns to step 1540. Otherwise, purchase confirmation acknowledgments are presented to the user, step 1550.

Processing then returns to step 1502, FIG. 6A.

One embodiment of the present invention is compatible with a set top box navigational system described below as applied to television programming. While television programming is a preferred application of the present invention, all types of content are contemplated within the scope of the invention. For example, the present invention may be applied to content provided over the Internet by on-line services, other communication networks, in kiosks or other information booths, by Internet browsing software, etc. Thus, the terms programming and content are used to generally describe all types of audio and video information as well as digital data, and merchandise.

A navigational system may be provided in which user choices are presented in an categorized and organized manner to facilitate navigation by viewers. The full set of available programming is organized into a number of product sectors, each of which represents some categorical class or business unit of programming, which correspond to the entries in product sector field 1302. As illustrated in field 1302 in FIG. 4A described above, examples of product sectors include adult, education, am movies, services, sports, games, and others. Each of the product sectors may have more particular sub-categories, or umbrellas of programming specific to that products sector, as illustrated in field 1370. For example, the am movie product sector may be broken into umbrellas in field 1370 such as family, western, action, etc., each representing a type of program available in the product sector.

In addition to organizing programming into product sectors, the navigational system may provide a number of navigation tools to viewers. The navigation tools provide current or future programming choices to viewers through different user interfaces.

Commonly owned U.S. patent application Ser. No. 09/018,541, entitled "METHOD AND SYSTEM FOR NAVIGATING THROUGH CONTENT IN AN ORGANIZED AND CATEGORIZED FASHION" and hereby incorporated by reference, illustrates the mental impression a user receives when navigating through the navigational system. For ease of illustration, FIG. 1 of application Ser. No. 09/018,541 illustrates only three domains that may be substituted with product sectors 10: educational, am movies, and sports. The product sectors 10 are arranged in a circle because they are sequentially accessible by the viewer in a looped configuration. That is, the viewer can move from the educational to the am movies product sector to the sports and then back to the educational product sector. Each time the viewer changes product sector along the loop, a perception of moving around the circle is realized.

As shown, a series of tools 12 are illustrated arranged along a radius of the product sector circle. Although the tools 12 are shown with reference to the educational product sector, they are accessible in each of the product sectors. The viewer may scroll from tool to tool within the educational product sector, and may change product sectors 10 while using one of the tools 12. As the viewer scrolls through the tools 12, the viewer gets a feeling of motion in a direction perpendicular to the direction of motion between product sectors 10.

At the intersection of each product sector and tool, representing a layer or level in the system and sometimes referred to herein as a "zone," the viewer is given a selection of posters or programming choices for viewing. The specific posters in each zone are determined by the current product sector, and the manner in which these choices are presented is determined by the tool being used. Posters representing programming content available in a given zone are aligned along an additional axis, pictorially represented in a linear fashion along a virtual vertical axis orthogonal to the radius 14. The movement within a zone from poster to poster provides the feeling of transition which is different than the transitions between product sectors or tools.

Available set top box hardware, remote control units, and the operation of tools are described in application Ser. No. 09/103,316 incorporated by reference above.

Figure 7:
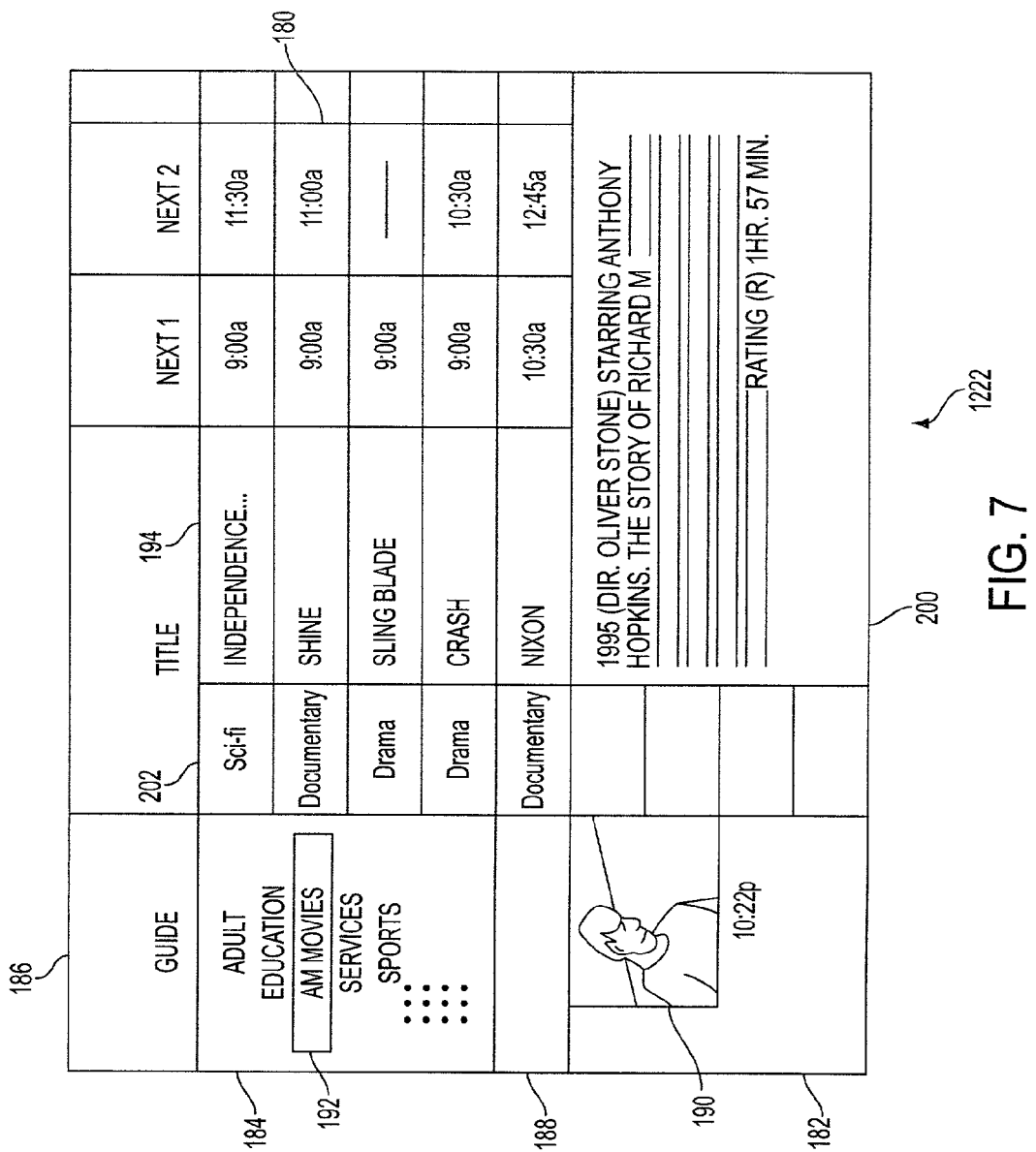
FIG. 7 is an exemplary guide tool screen illustrating screen elements used for an interface in one embodiment of the present invention.

With reference to FIG. 7 one exemplary tool comprises a "GUIDE" tool for displaying and facilitating selection of programs in a categorized fashion. A screen grid is displayed on television 1222 for providing direct program selection as an alternative to the poster selection method described with respect to FIGS. 5A-5D above. A guide or screen grid window 180 provides an interactive display area for listing programs in various sorting orders.

A pick menu 184 displays available product sectors in local product database 1220. The product sectors displayed in pick menu 184 are dynamically changing as local product database 1220 (FIG. 1) in set top box 1204 is updated from programming data model 1218 in head end 1200. The user may move a pick menu highlighter 192 up and down pick menu 184 to select the different product sectors available for display. As a different pick menu selection is highlighted, the related list of programming from local product database 1220 is displayed. The marquee name from field 1366 is displayed in column 194. An umbrella column 202 in the guide tool 202 displays the contents of the event content category field from field 1370 (FIGS. 3-4C) of marquee table 1346.

Time data for a clock 182 is synchronized with time received from head end 1200.

To help viewers keep track of their position in the navigational system, the tool screens provide a tool identifier 186. Tool identifier 186 appears at the top left corner of the screen and displays the name of the current tool.

A program highlighter 188 highlights the currently selected program. Highlighter 188 is a stationary highlighter allowing the user to scroll the programming on screen which is read from local database 1220. Alternatively, highlighter 188 may be a non-stationary highlighter which can be scrolled through programming listed on television 1222.

A picture cell 190 may be used to display the poster from field 1312 as the user highlights corresponding selections in pick menu 184 with pick menu highlighter 192. Alternatively, cell 190 may provide a picture in graphics advertisement for the currently selected program indicted by highlighter 188.

As the user scrolls through programming in grid 180, a description box 200 displays additional information about programs as they are highlighted. This information may be obtained from head end 1200 in real time as users select each program, or a separate description field may be employed in marquee table 1346 for storing data to be displayed.

In the guide tool illustrated in FIG. 7, the user may sort the individual programs by event content, time of day, date, or alphabetically. The structure of local product database 1220 described above facilitates different sorts in any tool applied to the programming data contained therein. For example, because marquee ID field 1364 in marquee table 1346 is an indexed field, one skilled in the art would recognize that the data contained therein may be used to sort programming by column 194 within the guide tool.

Figure 8:
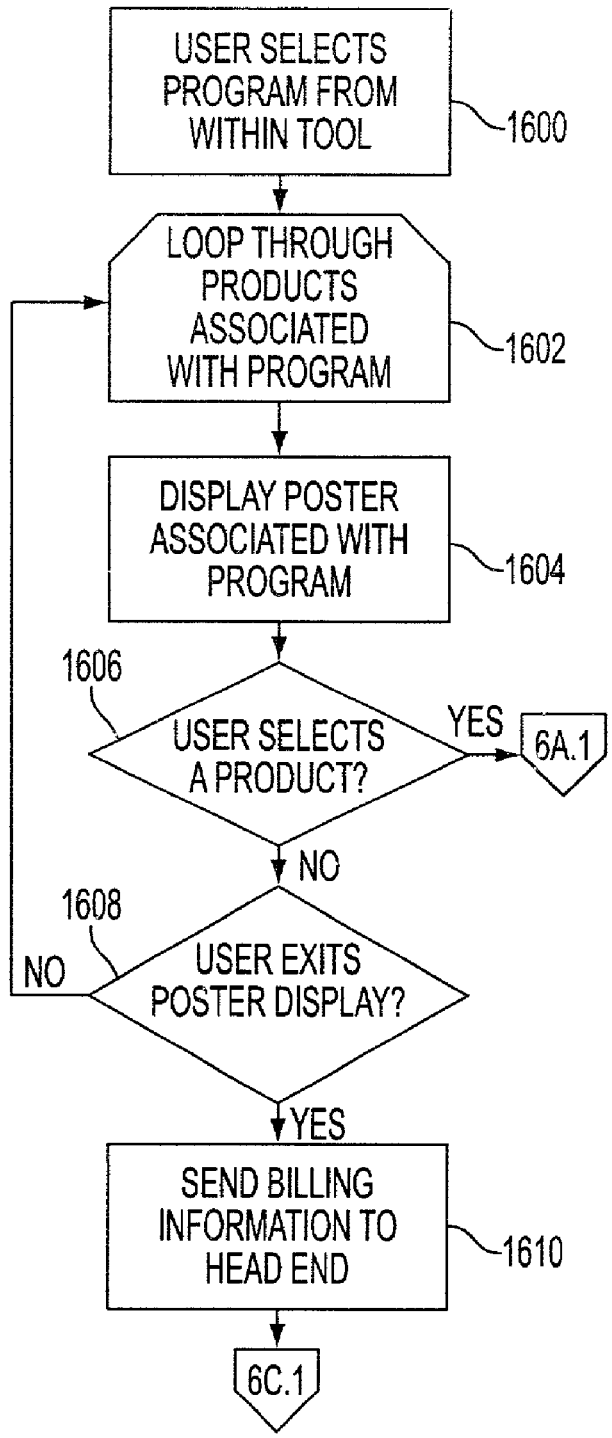
FIG. 8 is a flow chart showing the process of selecting a program for viewing from one of the tools.

With reference to FIG. 8 a flow diagram illustrating program selection from the guide tool, or from other tools, is illustrated. Starting at step 1600, the user selects a program on screen. Using the relationships set up in local product database 1220, set top box application 1216 sets up a loop through posters for products which that program is a part of, step 1602. Posters for the associated products are displayed on screen, step 1604. Referring back to FIG. 5A, an exemplary screen displaying the posters is shown. The user is given the opportunity to selected one of the products by choosing one of the displayed posters, as described above with reference to FIG. 5A, step 1616. If the user selects a poster, processing returns to step 1510, (FIG. 6A).

The system checks to see if the user exits the poster display without choosing a poser, step 1608. If the user does not exit poster display, processing moves back to step 1602. Otherwise, processing continues for selection of the original individual program selected from within the tool by sending billing information for the individual program only to head end 1200 for forwarding to billing system 1206, step 1610. Processing then moves back to step 1542 (FIG. 6C).

Other various navigation tools which can be provided to display poster and programs of the present invention are described in greater detail in application Ser. No. 09/103,316 incorporated by reference above. Also described therein is the process of tagging selected programming, storing tags, and presenting programs when it is time for a tagged program to be shown. One skilled in the art would readily recognize that the tagging, storing, and presenting techniques could easily be employed to program records, merchandise records, games, and other selectable entitles of the present invention.

Figure 9:
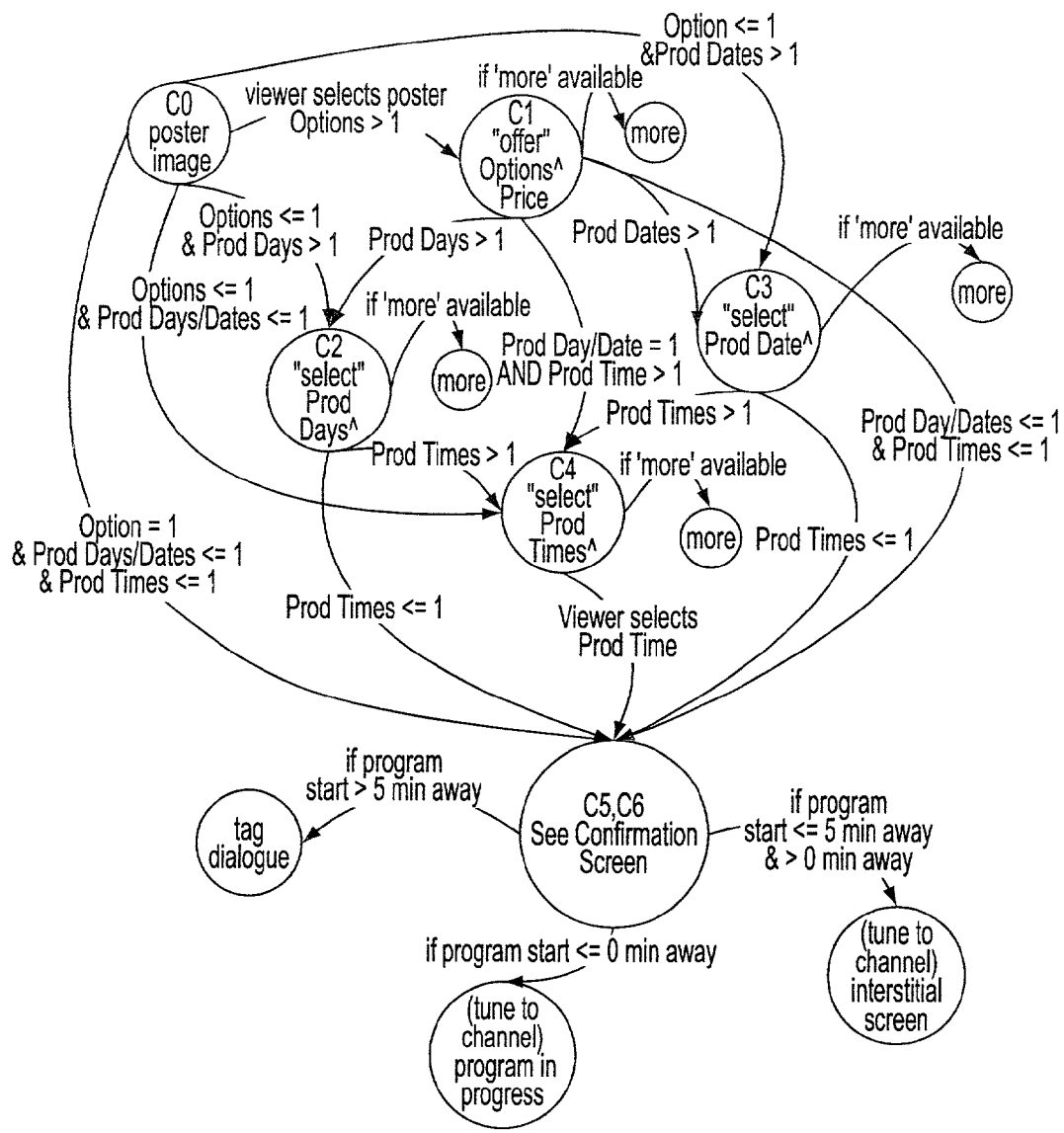
FIGS. 9-11 depict a generic purchase sequence according to one embodiment of the invention.
Figure 10:
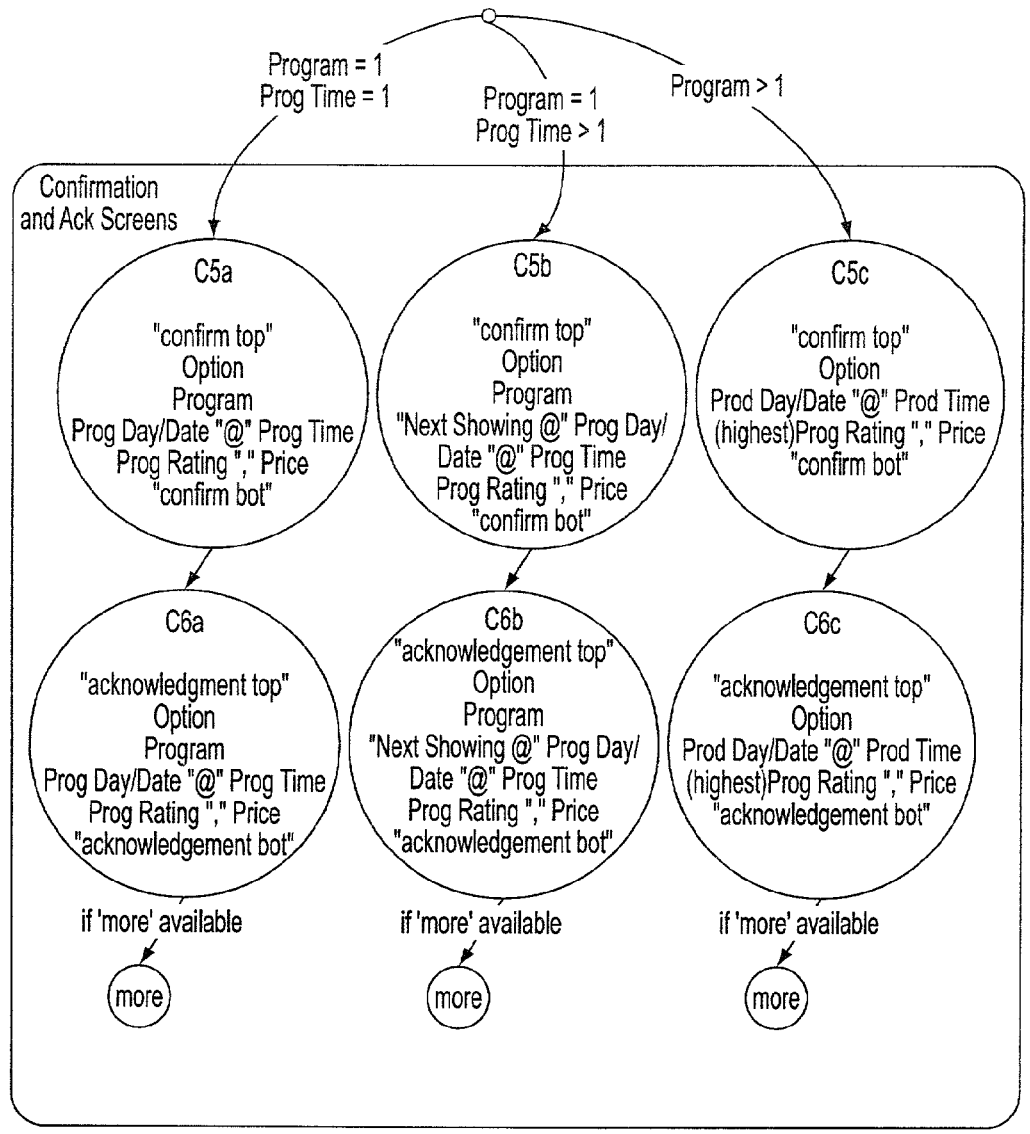
Figure 11:
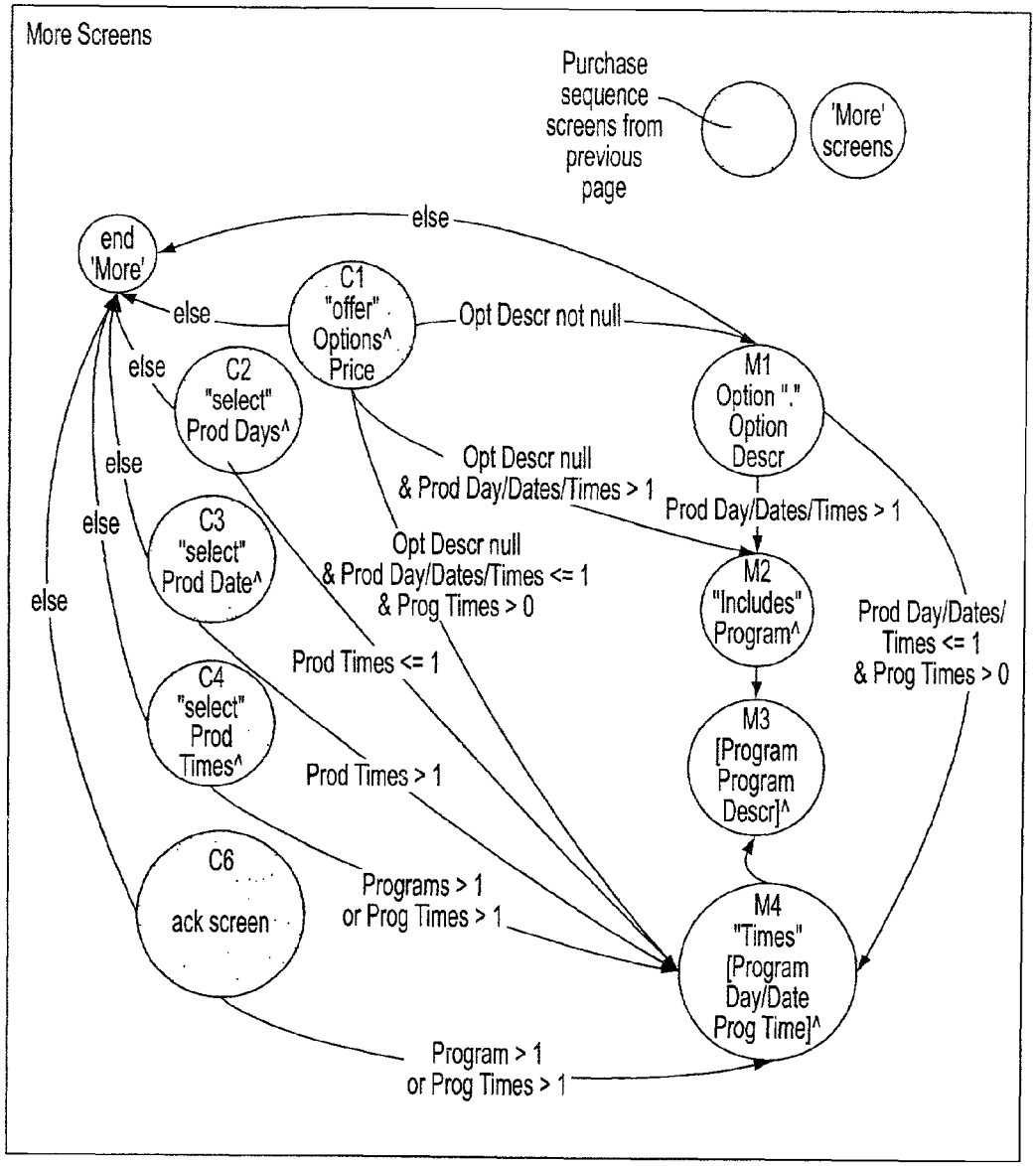

FIGS. 9-11 depict a generic purchase sequence according to one embodiment of the invention. Specifically, FIGS. 9-11 together depict a functional state diagram of the generic purchase sequence depicted. Each depicted state represents a screen state. In this embodiment, there can be only one active state at any given moment. However, it is possible to combine multiple states into one screen, as long as only one state is active and the others are inactive (as can be the case regarding the "more" screen designs as depicted in FIG. 14). Core purchase sequence states are labeled C0 through C6. "More" screen states are labeled M1 through M4. Generally, in FIGS. 9-11, field names are capitalized, dialogues are enclosed in quotation marks, """ indicates a scrolling screen or list, actions are enclosed in parentheses, and fields grouped for a scrolling list are enclosed in brackets.

FIG. 12 depicts a schema for a dialogue table for one embodiment of express cinema data improvements. In some embodiments, marquee/event attributes can be pertinent and can be added. Additionally, tables such as category or umbrella tables apply.

In one embodiment of the invention, movies titles, games, and events are represented as a marquee record. Things that can be bought are represented in the marquee record and product data type, and are also associated with posters. In the embodiment depicted in FIG. 12, however, the data model has three distinct entities: movies titles, games, and events which utilize a transport resource and are broadcast; options, which are different ways that things can be bought, and can also be considered a grouping of products; and posters, which are authored groupings or representations of options. In some embodiments, posters and programs are represented in the user interface as marquees in a tool guide or virtual channels in a channel tool. In some embodiments, options are included as marquees or virtual channels. Event type attributes such as start time, freeview duration, and the like can be included in a program list or table. A schedule table 1202 can describe broadcast schedules for programs, and utilize a day/time bitmap to provide NVOD efficiencies. A product availability table 1204 can describe an option or product "schedule" that is distinct from a program schedule. A dialogue table 1206 can be added to give flexibility in the screen dialogue text. While shown as separate items, the dialogue table 1206 is actually a single table.

The following is a list of certain embodiments of fields and descriptions associated with particular tables. It should be understood that the tables, fields, and descriptions thereof, including any rules, represent only one particular embodiment, and one skilled in the art could construct numerous alternative embodiments based on the disclosure herein, with different tables, fields, descriptions of fields, or rules.

Poster Table:

Poster sort index: index into poster sort table (mandatory, numeric);

Poster ID: poster unique identifier (mandatory, numeric);

Poster name: text name or title of poster (text). A poster name in mandatory for any poster that will be listed as a marquee;

Poster Descr: optional description of poster (optional, numeric), must have a value if "disp marquee flag" is a "1". The poster description is not available in the purchase sequence;

Option Dialogue: index to dialogue table (mandatory, text). This index will point to the dialogue that appears at the top of the "option" modal after the viewer selects the poster. A typical dialogue is "how would you like to buy?"

Opt rec, sec, part: A three part index into the options table (mandatory, numeric). Each poster must have at least one option tied to it.

Disp marquee flag: The poster name is displayed in the guide tool as a marquee if this flag is "1" (optional, numeric).

Disp channel flag: The poster name is displayed in the channel as a virtual channel (optional, numeric).

Option Table

Poster ID: index into the Poster Table (mandatory, numeric). The same option can be tied to more than one poster.

Opt rec, sec, part: three part key for records in this table (mandatory, numeric). Also index into the Program Table. Option sections and parts are used for multiple-sectioned options. Can to be used for 'Game' options in sorts packages, buy one get one free, genre packages, etc. Individual games can be listed as discrete options along with 'Ticket', and 'Weekend'.

Option name index: index into the Option Name Table (mandatory, numeric). This field is indexed in the anticipation that there may be many option names that would be reused between option records, such as 'one time'.

Option description index: index into the Option Description Table (optional, numeric). Not all options will have a description, as in the case of 'one time' or 'all day', but some might, as in the case of 'Season Ticket.' All options to be displayed as a marquee require an option description. Therefore, must have a value if 'disp marquee flag'='1'.

Option price index: index into the Price Table (mandatory, numeric).

Prod availability index: index into the Product Availability Table (mandatory, numeric). Most entries will have product availability dates/days/times associated with them, and some options will be associated to more than one prod availability to more than one prod availability index. This field could be a range of Prod Availability Indices for multiple product dates, as in the case of NFL 'Weekend' which is offered for more than one weekend. All impulsively purchasable options must be associated to at least one product availability index, since the product id's reside in the Product Availability Table. Some Options may be associated with product availability dates/day/times, as in the case of an email subscription. However, the email option would still have a pointer into the Product Availability Table.

Confirmation dialogue top: Index into the Dialogue Table (optional, numeric). This is the dialogue presented at the top of the confirmation screen which appears after a viewer has selected a purchase. Ex., "You have selected."

Confirmation dialogue bot: Index into the Dialogue Table (optional, numeric). This can be a dialogue presented at the bottom of the confirmation screen which appears after a viewer has selected a purchase, for example, "Press gimme if you want to buy."

Ack dialogue top: Index into the Dialogue Table (optional, numeric). This can be the dialogue presented at the top of the Acknowledgement screen which appears after a viewer has completed a purchase, for example, "Enjoy your purchase of".

Ack dialogue top: Index into the Dialogue Table (optional, numeric). This can be the dialogue presented at the bottom of the Acknowledgment screen which appears after a viewer has completed a purchase, for example, "Check bookmarks for programs and show times".

Disp marquee flag: The option name is displayed in the guide tool as a marquee if this flag is '1' (optional, numeric).

Option Name Table

Option Name Index: key for the Option Name Table (mandatory, numeric).

Option Name: The name of the options listed in the options offer screen (mandatory, numeric). In one embodiment, maximum size is 14 characters. The option name may not be null. The option name should not be identical to the poster name as they may appear side by side in the Guide Tool.

Option Description Table

Option Description index: Key for theOption Description Table (optional, numeric). Not all options require a description. The use of this field is determined by authoring.

Option descr: Describes the option (mandatory, numeric).

Program Table

Note: While called a "program table", this actually represents a list of the lowest level purchasable "thing". In the case of NVOD, the item for sale can be a movie. However, support is provided for sale of subscription services such as HBO or e-mail, and retail items, data channels, telephone/data services, etc.

Program id: Program unique identifier (mandatory, numeric); also is the index into the Schedule Table. Not all programs require a schedule record.

Opt rec, sec, part: Three part index into Option Table (mandatory, numeric). All options, including service subscriptions like 'email', must have any entry in this table. All options must be tied to at least one program due to the design of the purchase confirmation and acknowledgement screens which require a program name. All products within an option do not have to contain the same programs. For example, the 'Weekend' option for NFL programming will contain different programs (games) for each different product starting every Saturday in November.

Prog name: Name or title of program (mandatory, text); name used in Marquee, and can be used in 'more info' modal screens.

Event cont cat: Category describing content of program (mandatory, text). Also used as sort field for programs.

Disp marquee flag: The program is displayed in the guide tool as a marquee if this flag is '1' (optional, numeric).

Dips. channel flag: The program is displayed with an associated poster as virtual channel in the channel tool (optional, numeric). Whether a channel tool concept is used will determine if this field is necessary in this table.

Schedule Table

Note: the records in this table describe the broadcast schedule of the individual programs. Show times for an impulse purchase are determined by comparing the product availability times with the program schedule times. Showtimes are determined by the program schedule times that fall within the product availability times.

Sched rec: Key for this Schedule Table (mandatory, numeric).

Serv id: Channel service id. Used for tuning (mandatory, numeric).

Program id: Index into Program Table (mandatory, numeric). One program may have multiple schedule records. Subscription services like 'email' are not associated with a schedule record.

Prog st days: Describes the days of week the program is aired (optional, numeric). Optional, must be null if 'prog st date' or 'prog st time' has a value. All three may be null simultaneously.

Prog st date: Describes the date the program is aired (optional, numeric). Optional, must be null if 'prog st day' or 'prog st time' has a value. All three may be null simultaneously.

Prog st times: The day of week and times the program is aired (optional, numeric). Optional, must be null if 'prog st date' or 'prog st date' has a value. All three may be null simultaneously.

Prog dur: Duration of the program. Assumes that all instances of this program have the same duration (optional, numeric).

Disp record: Do not display record as part of program show times in guide tool, if '0' (numeric).

Product Availability Table

Product availability index: Key for this Product Availability Table (mandatory, numeric). There may be multiple product availability records for one option, as in 'Weekend Pass'.

Prod st day: (Day bit map) Day of week the option is offered (optional, numeric); optional, must be null if 'prod st date' or 'prod st time' has a value. All three may be null simultaneously. Only known use at this time is for all day products.

Prod st date: Start date the option is offered (optional, numeric); optional, but must be null if 'prod st day' or 'prod st time' has a value. All three may be null simultaneously. An additional bit map field is needed to show multiple show times on a single date. Only 24 hours worth would be needed.

Prod st time: (Day and Time bitmap) The day of week and the times an option is offered (optional, numeric); optional, but must be null if 'prod st date' or 'prod st day' has a value. All three may be null simultaneously.

Prod dur: Duration which the option spans (mandatory, numeric). For example, 'Sci Fi Fest Weekend' may last 3 days or 72 hours. A specific value, for example, '9999' can be used for a subscription service.

Pro id: Blob of product id's associated with the days/dates/times above (mandatory, numeric). "Prod st time" is a 24 hour bit map at 15 minute intervals. It is used to specify times for the day of the week or a specific date. In NVOD, a particular movie can be playing on the same schedule for many days or the whole week. This would result in a variable length field.

Dialogue Table

Dialogue index: Key for this Dialogue Table (mandatory, numeric).

Dialogue: Text dialogues used throughout the purchase sequence (mandatory, numeric).

Poster Sort Table

Poster sort index: Key for this Poster Sort Table (mandatory, numeric).

Poster sort name: Sort name for posters (mandatory, text).

Figure 15:
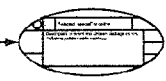
Figure 18:
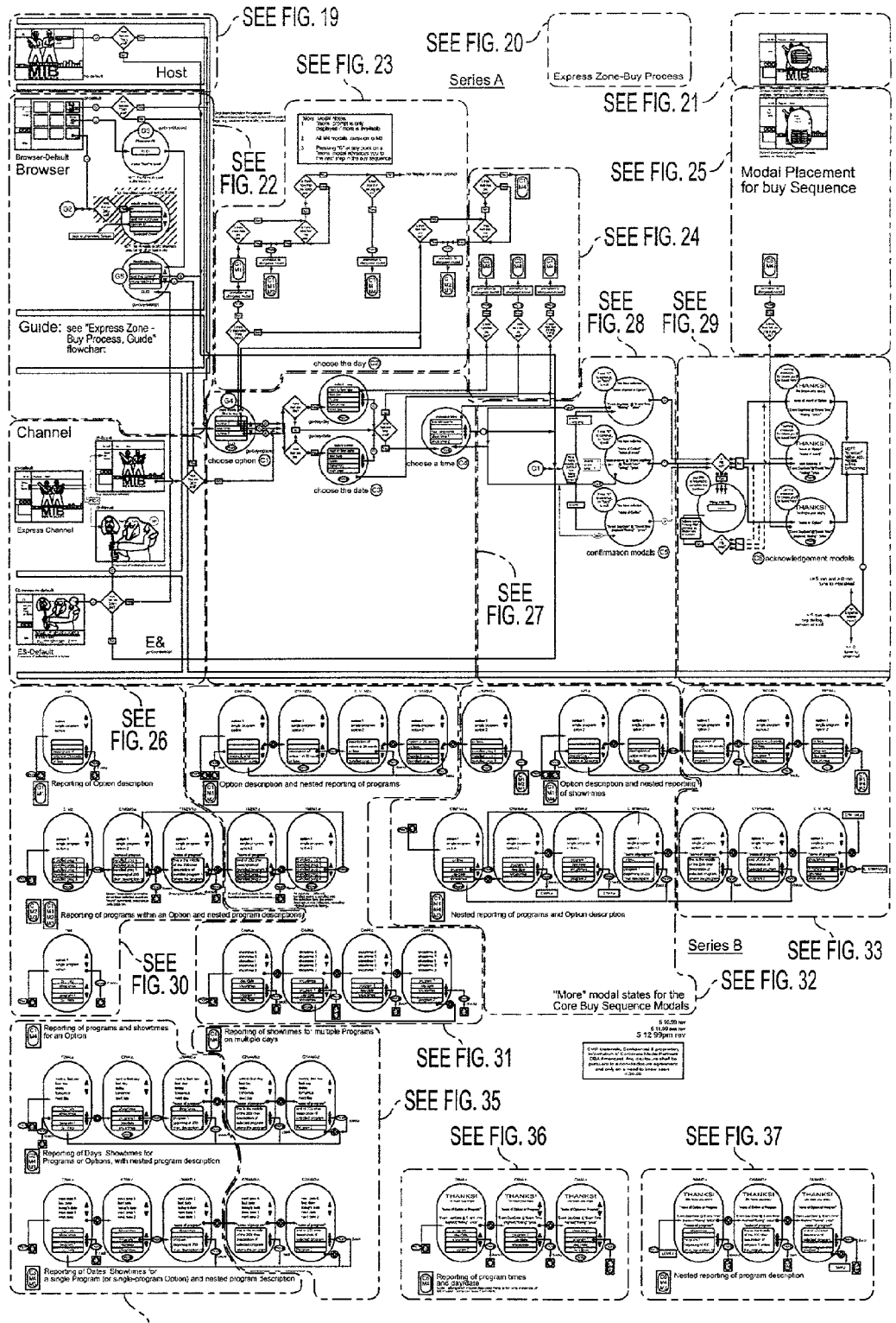
FIG. 18 depicts purchase request program large scale flow diagrams, including graphical user interface depictions, and depicting a series A and a series B.
Figure 19:
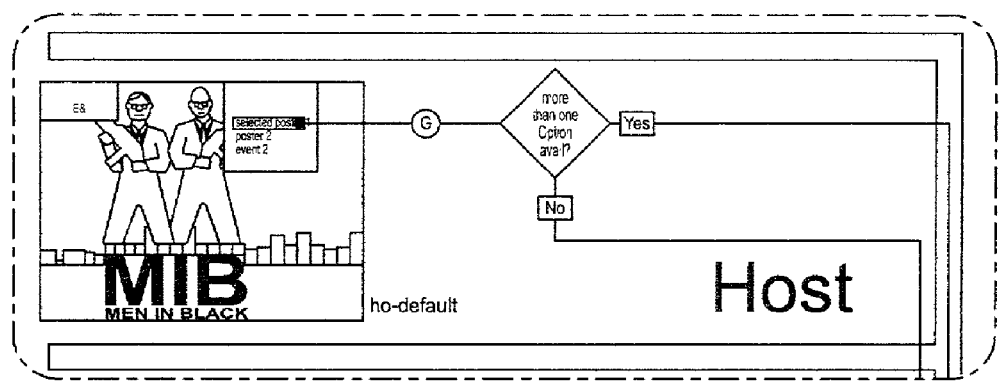
Figure 20:
Figure 21:
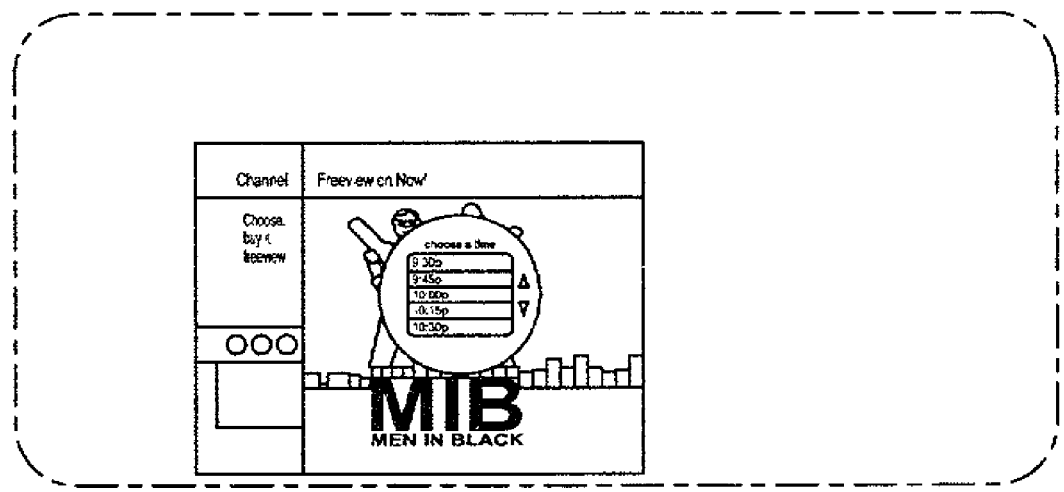
Figure 22:
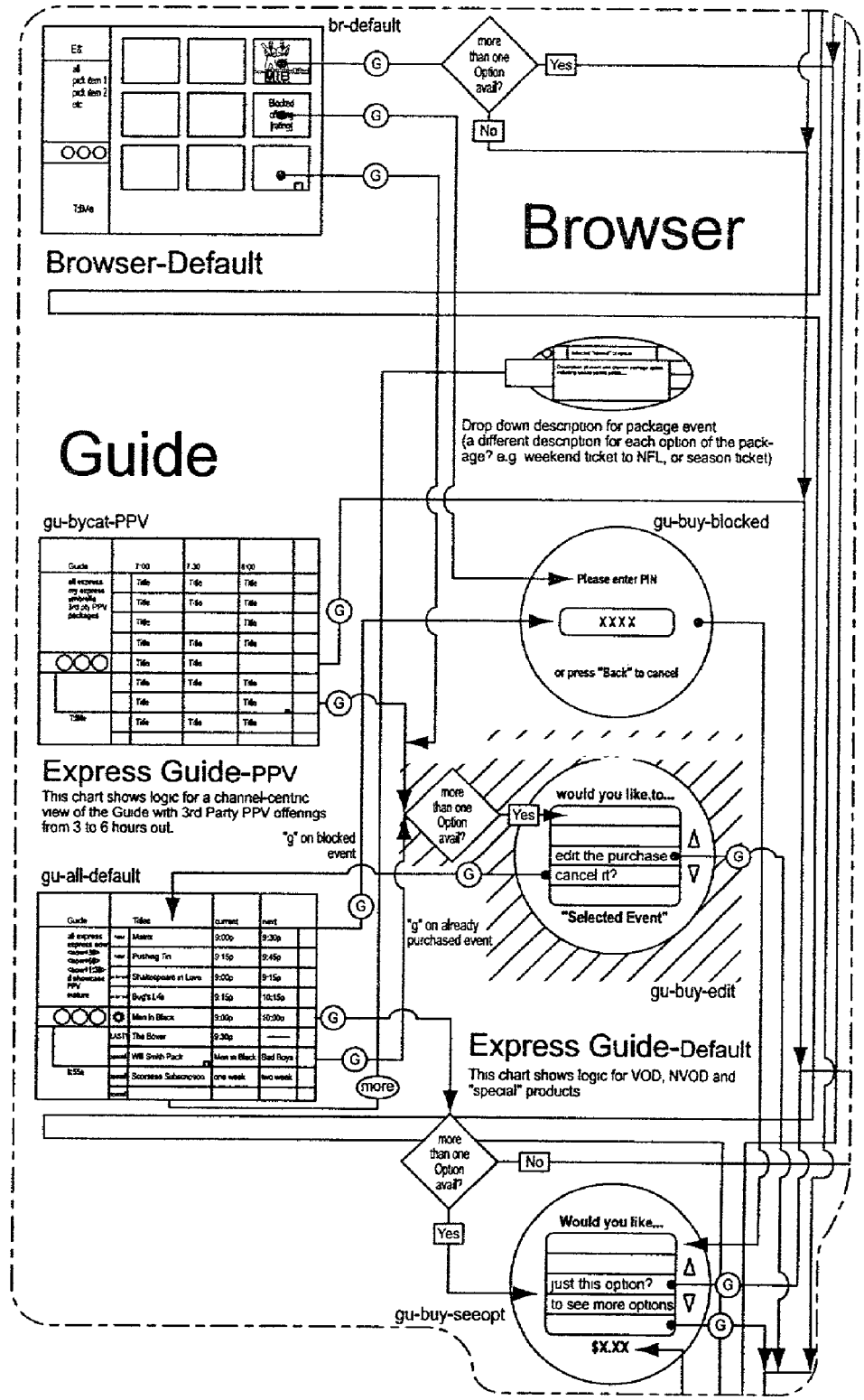
Figure 23:
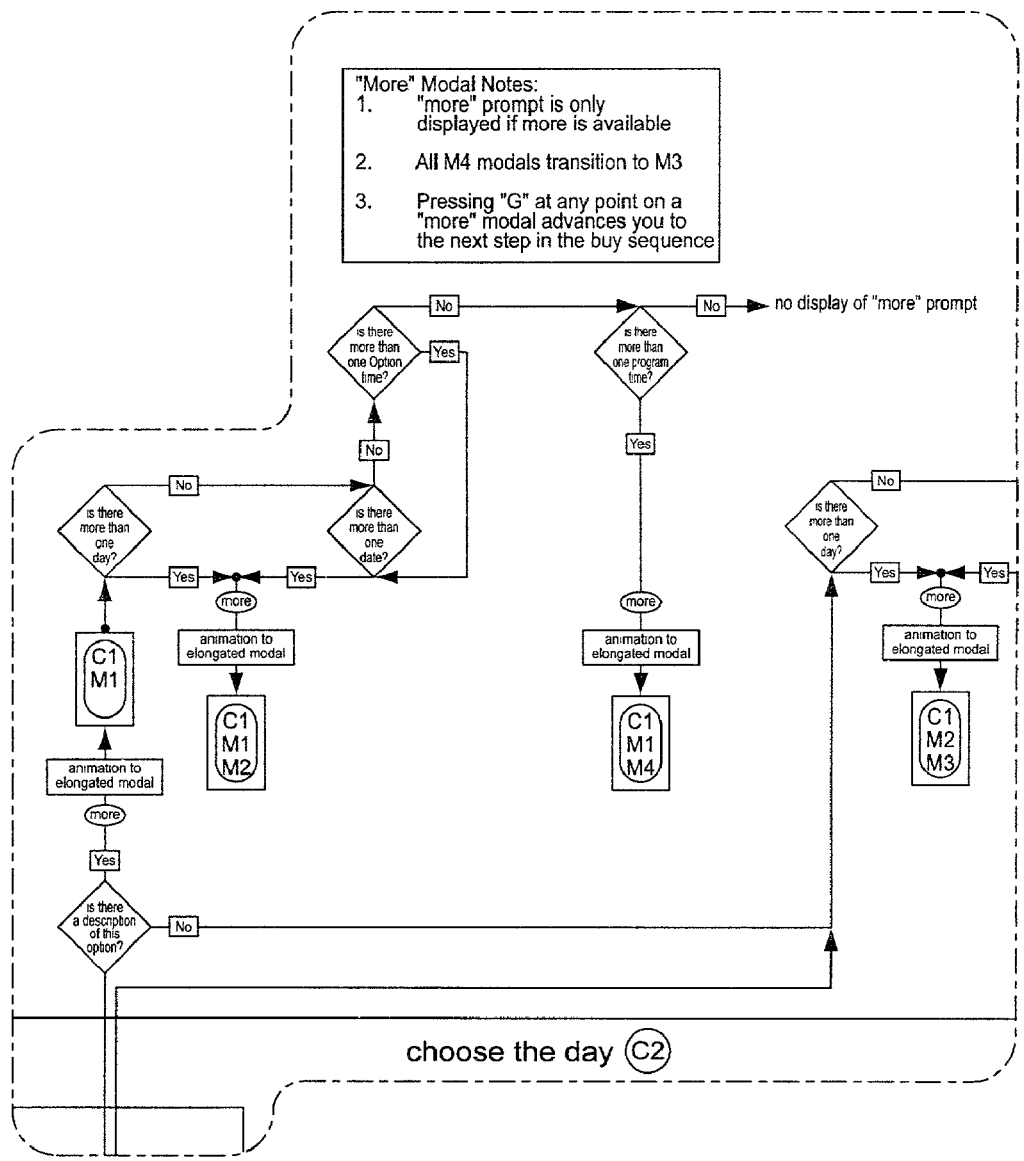
Figure 24:
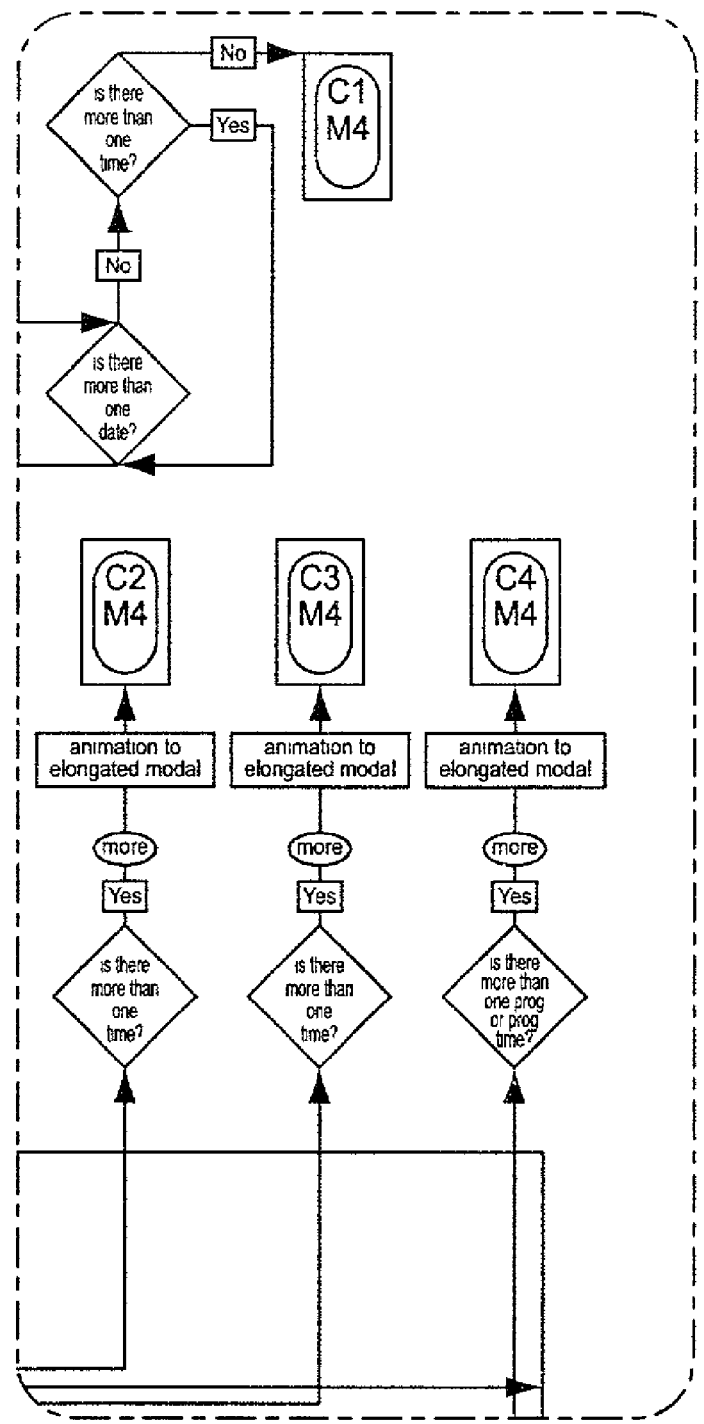
Figure 26:
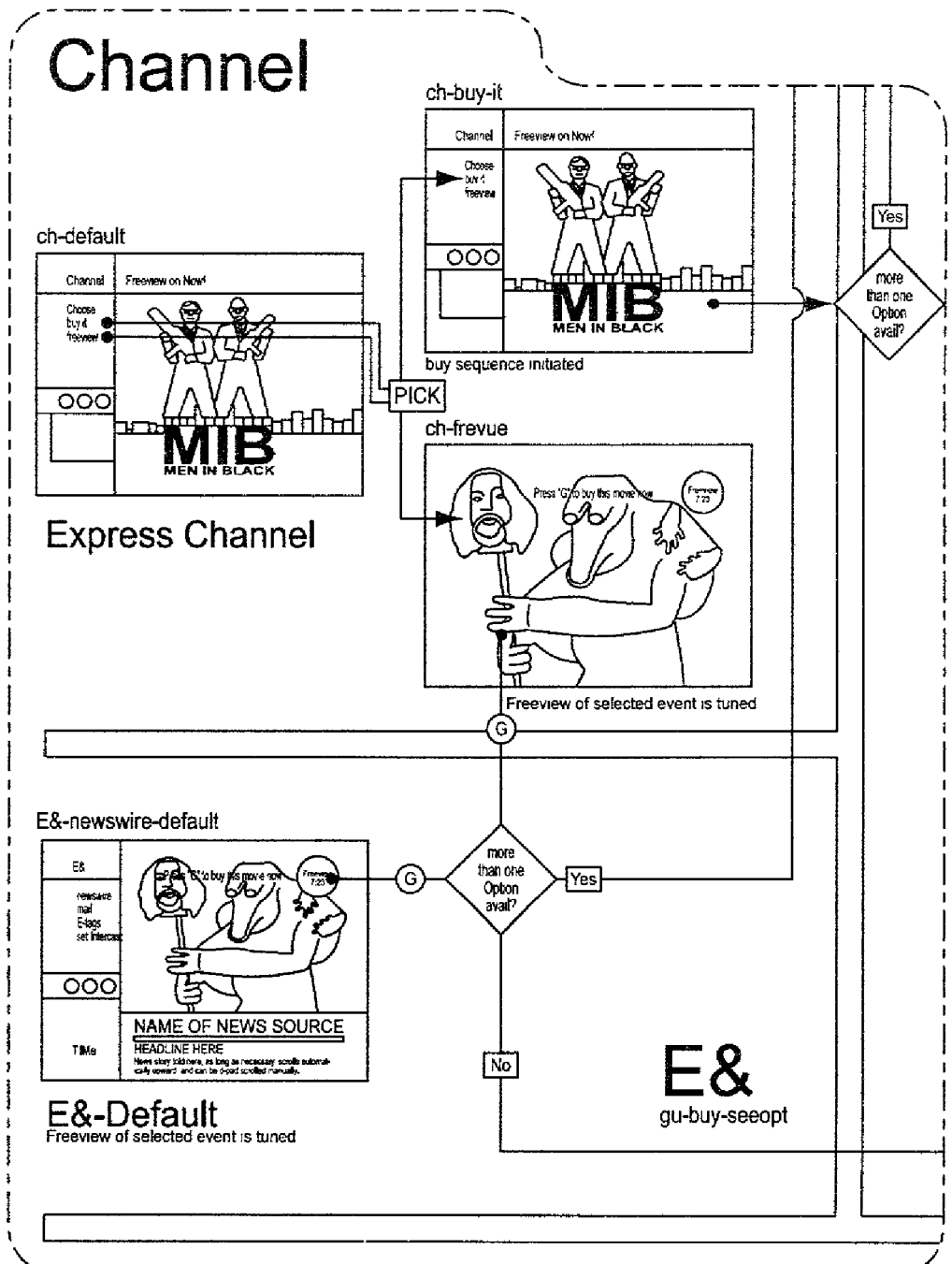
Figure 27:
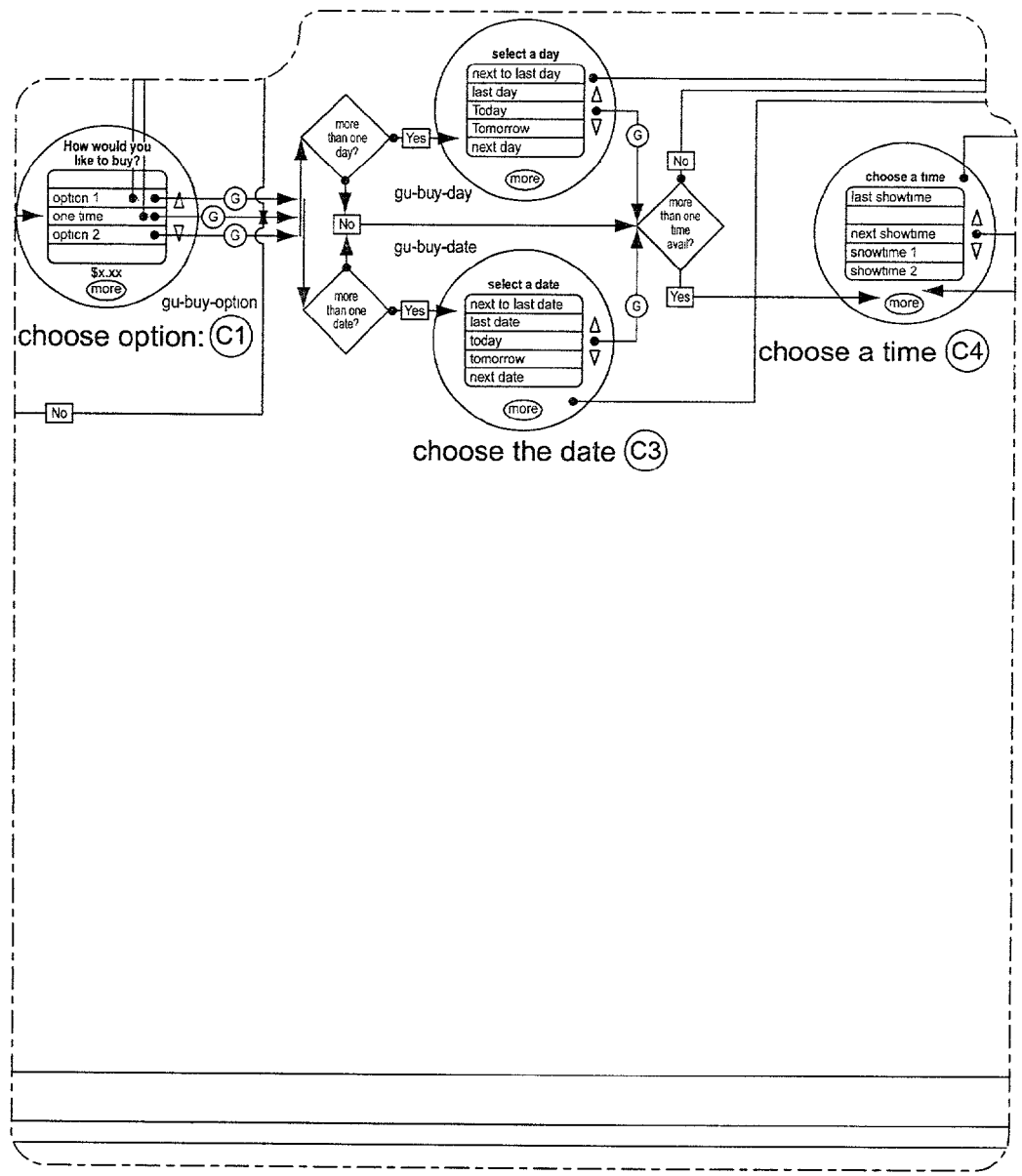
Figure 28:
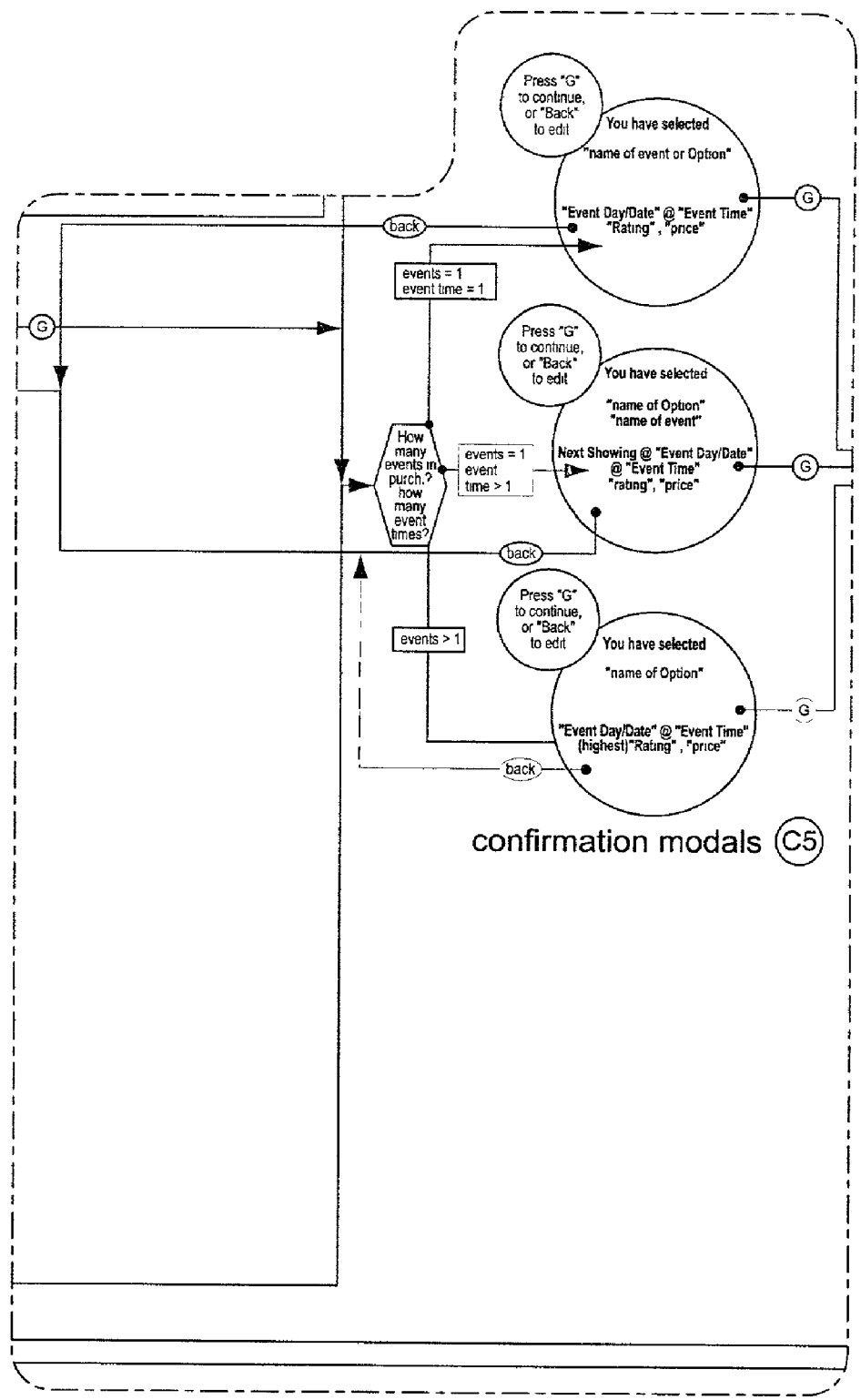
Figure 29:
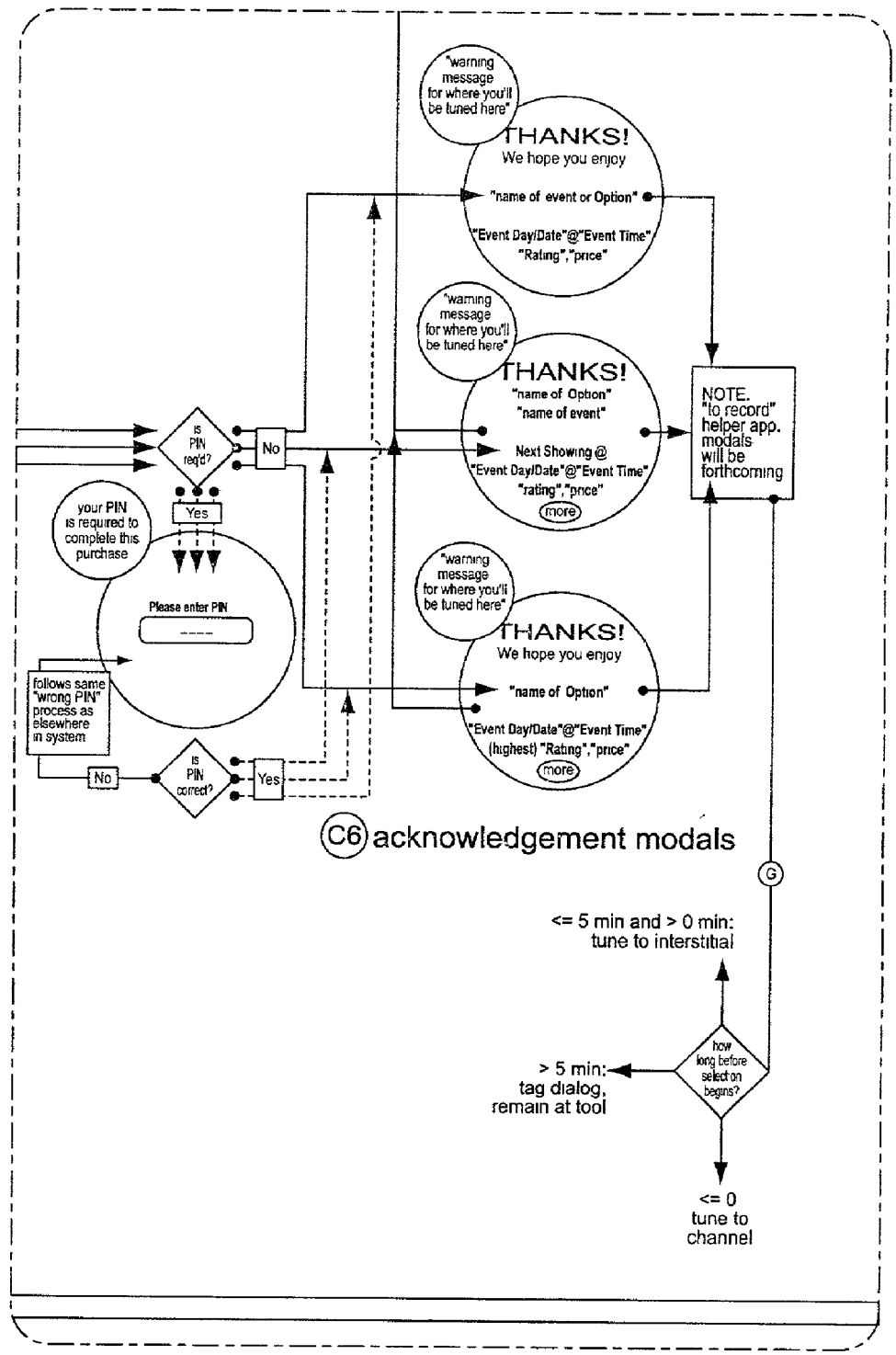

FIGS. 13-17 are simplified depictions of a graphical user interfaces according to one embodiment of the invention. Specifically, FIG. 13 includes simplified depictions of a graphical user interfaces relating to animation from peephole modal to elongated modal, and nested reporting in elongated peephole. FIG. 14 includes simplified depictions of a graphical user interfaces relating to an express guide timing progression. FIG. 15 includes simplified depictions of a graphical user interfaces relating to an express zone buy process guide. FIGS. 16 and 17 include simplified depictions of a graphical user interfaces relating to Express Guide package scrolling FIG. 18 depicts purchase request program large scale flow diagrams, including graphical user interface depictions, and depicting a series A and a series B. FIGS. 19-29 depict small scale depictions series A of FIG. 18, and can be assembled in accordance with series A of FIG. 18. FIGS. 30-37 depict small scale depictions series B of FIG. 18, and can be assembled in accordance with series B of FIG. 18. The following table can be utilized to assemble the depictions of FIGS. 19-37 to be in accordance with series A and series B of FIG. 18, in which the numbers in parentheses indicate the matrix relationship of each of FIGS. 19-37 in the form (row, column):

| Series A: | | | |
| --- | --- | --- | --- |
| FIG. 19 (1/1) | [blank space] (1/2) | FIG. 20. (1/3) | FIG. 21 (1/4) |
| FIG. 22 (2/1) | FIG. 23 (2/2) | FIG. 24 (2/3) | FIG. 25 (2/4) |
| FIG. 26 (3/1) | FIG. 27(3/2) | FIG. 28 (3/3) | FIG. 29 (3/4) |

Figure 30:
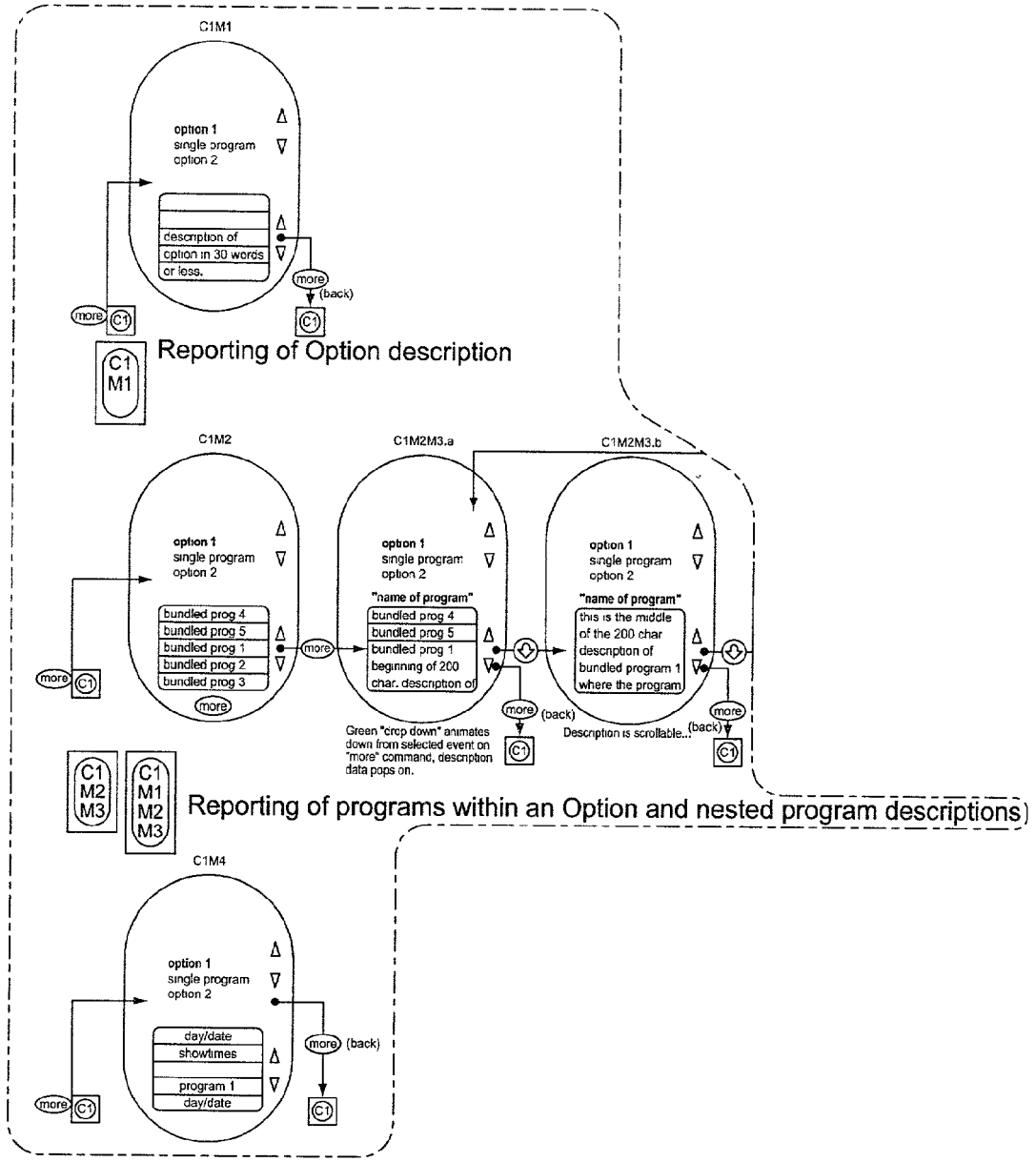
FIGS. 30-37 depict small scale depictions series B of FIG. 18, and can be assembled in accordance with series B of FIG. 18.
Figure 31:
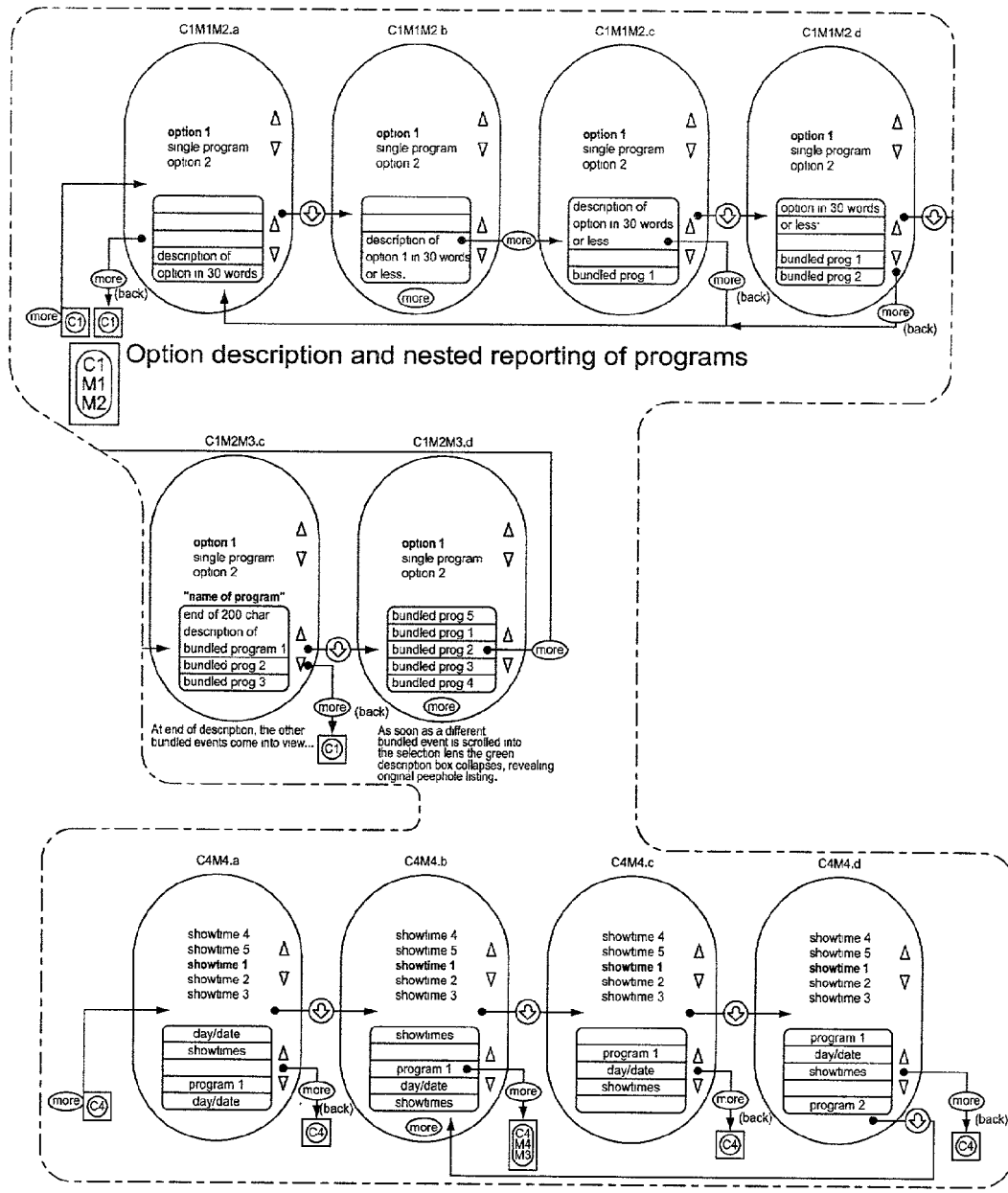
Figure 32:
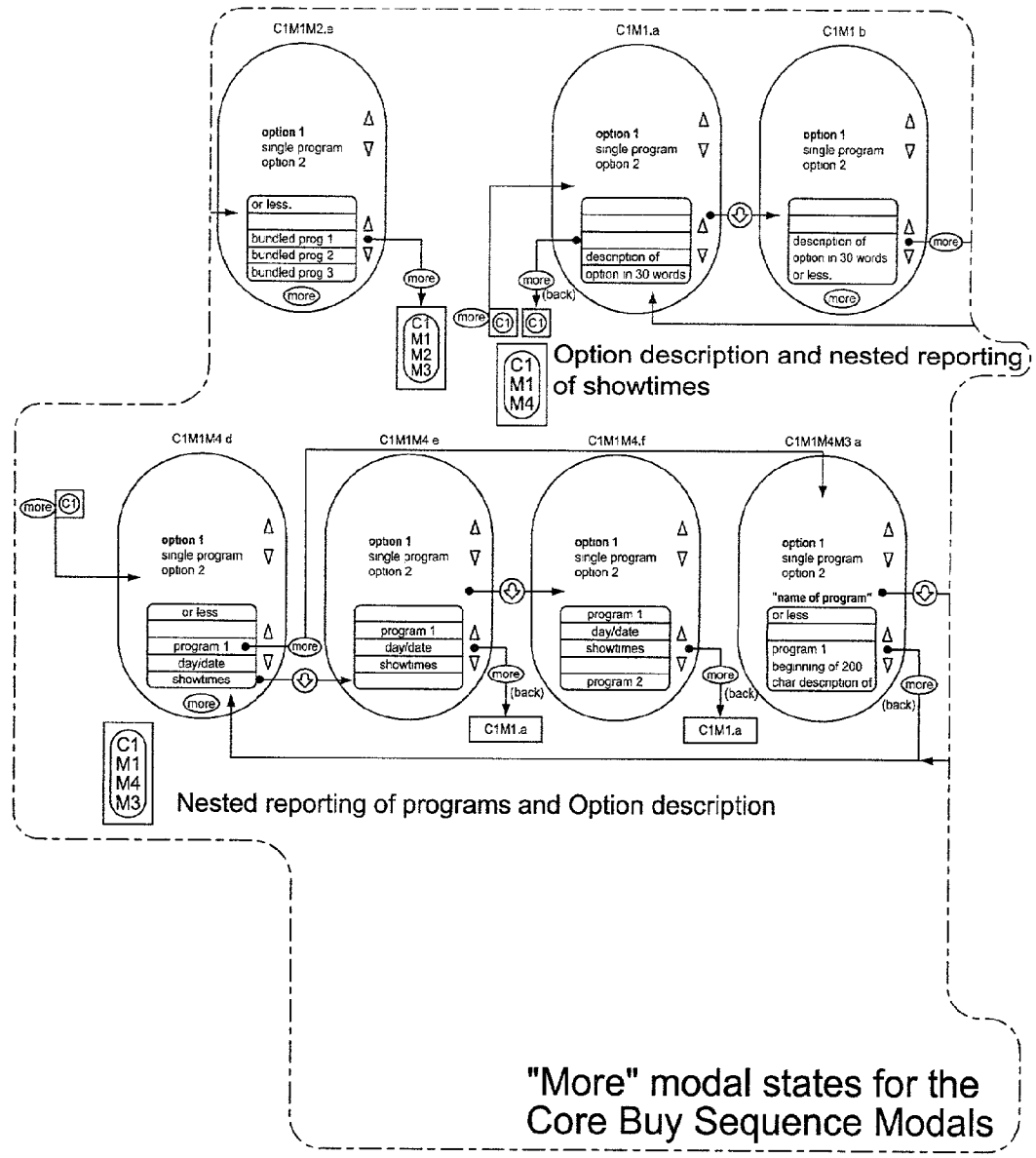
Figure 33:
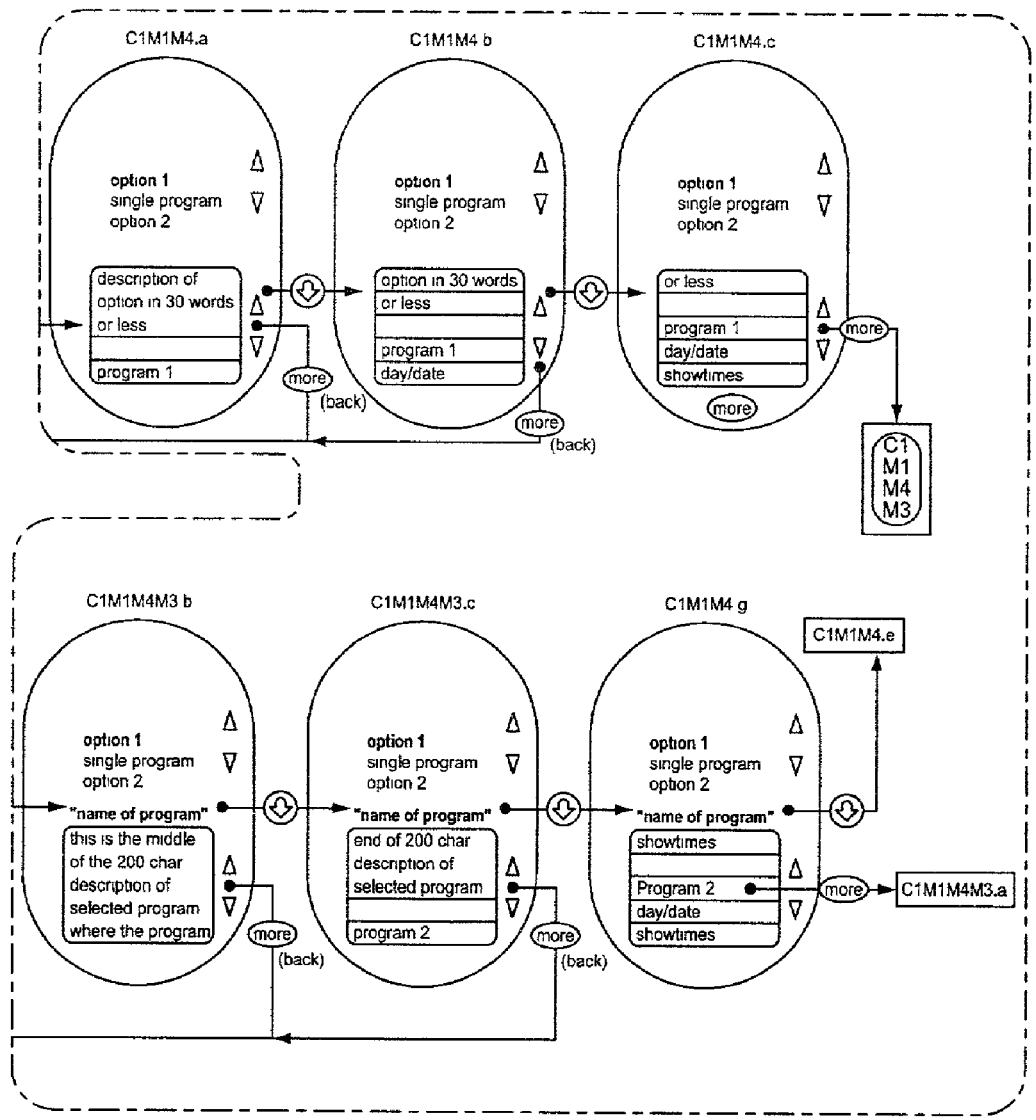
Figure 34:
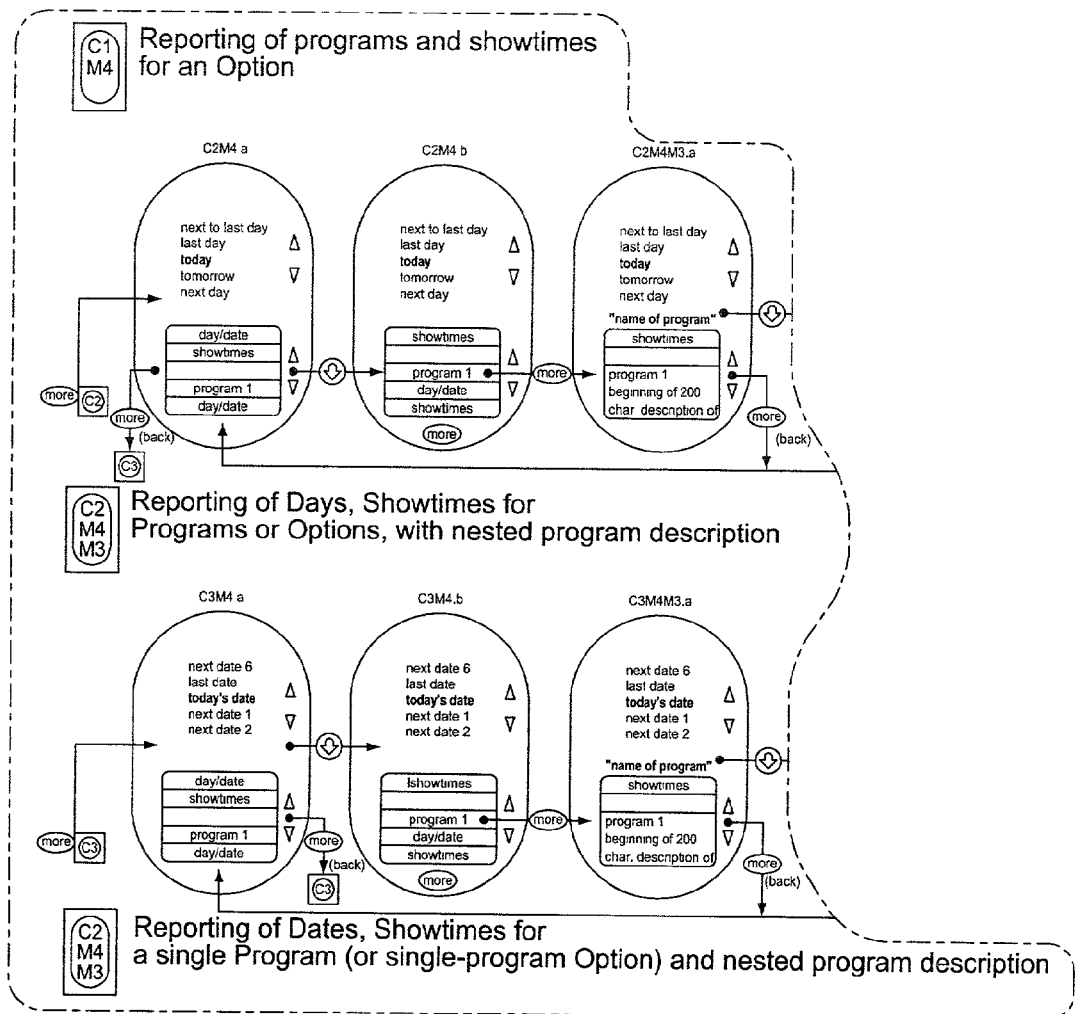
Figure 35:
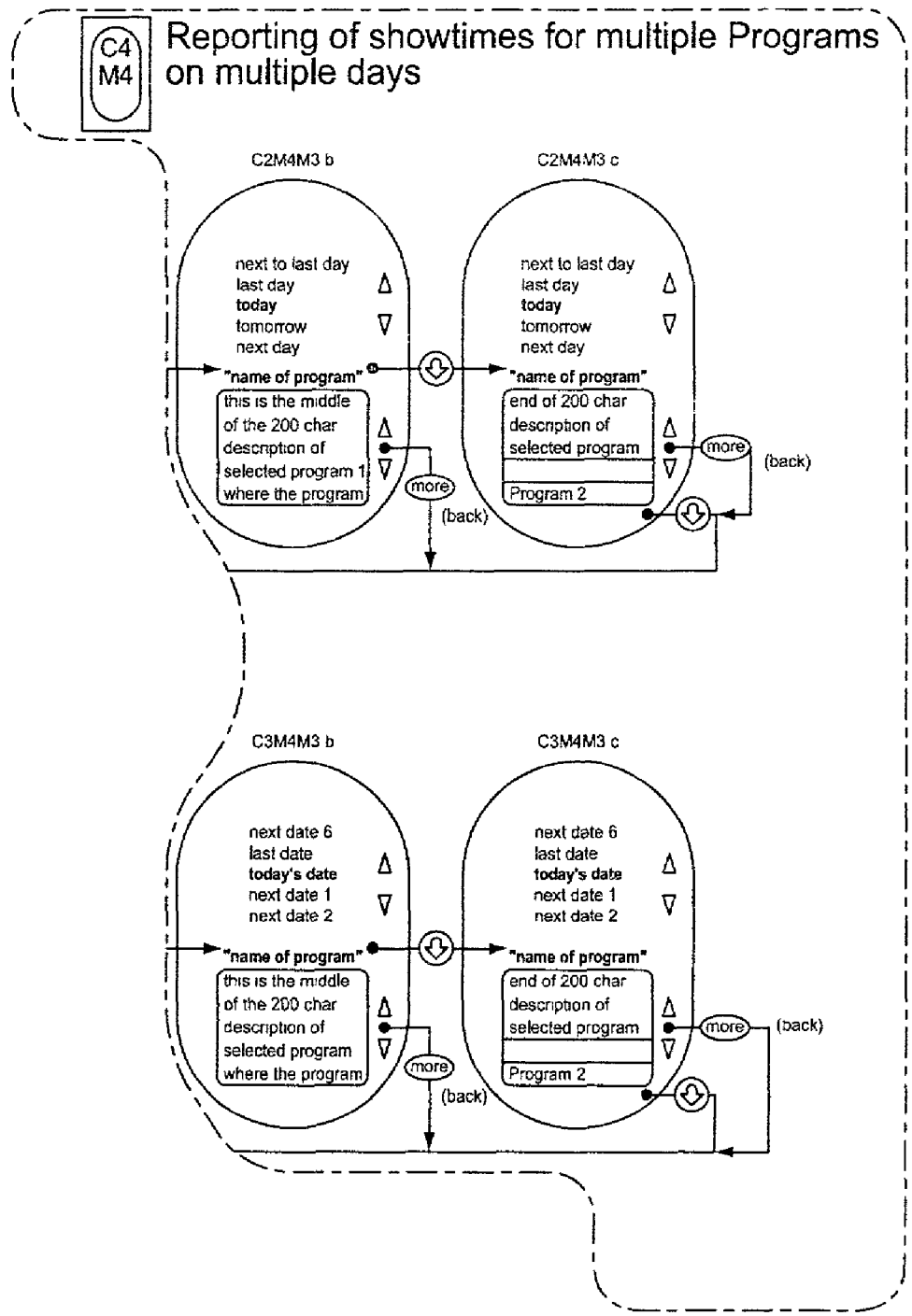
Figure 36:
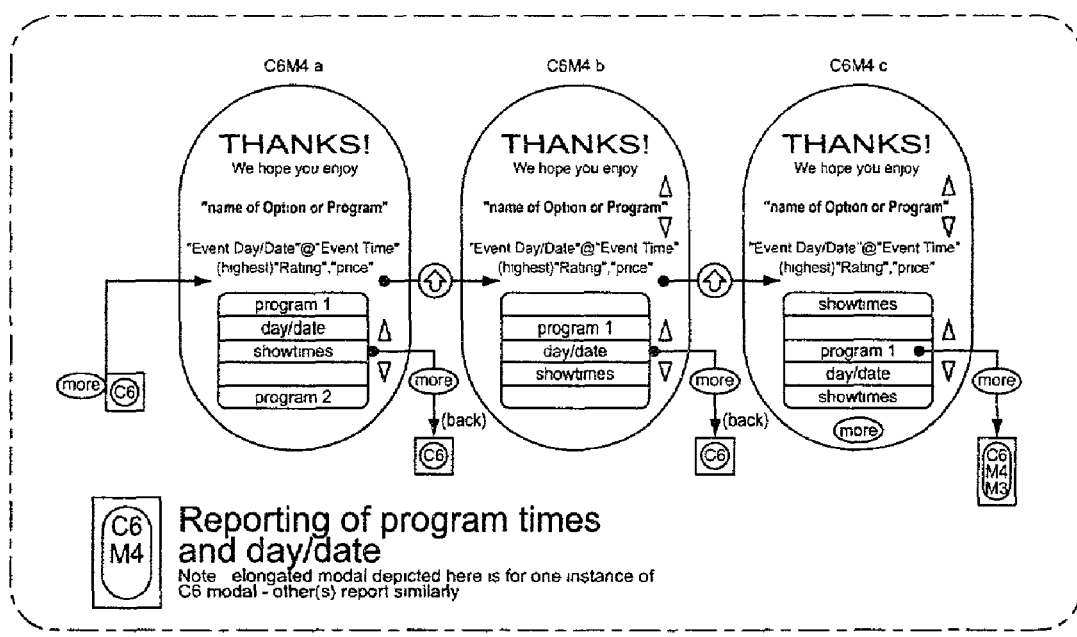
Figure 37:
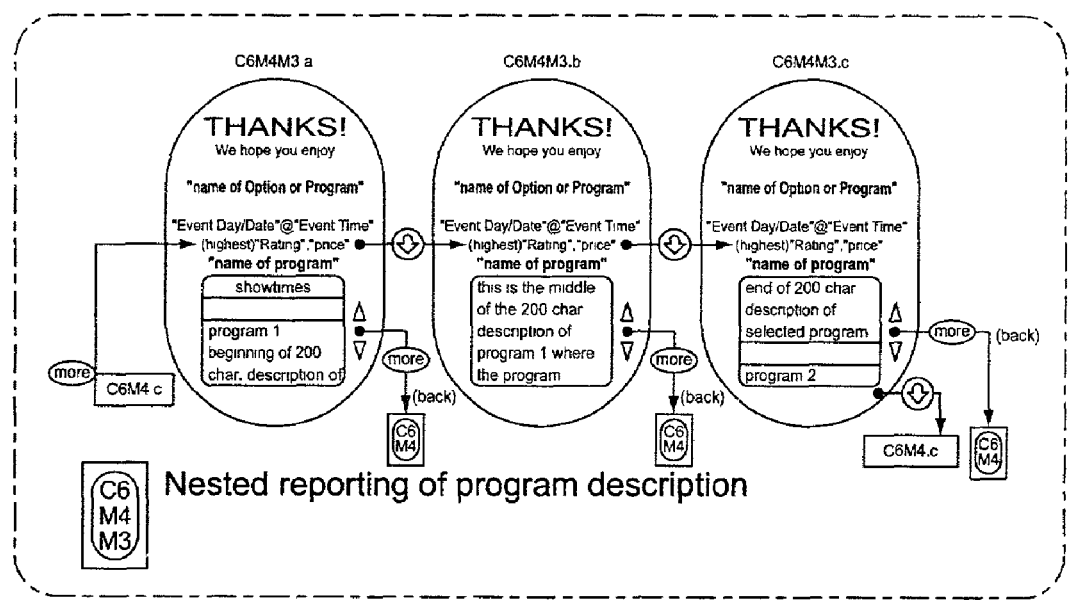

| Series B: | | | |
| --- | --- | --- | --- |
| FIG. 30 (1/1) | FIG. 31(1/2) | FIG. 32 (1/3) | FIG. 33 (1/4) |
| FIG. 34 (2/1) | FIG. 35 (2/2) | FIG. 36 (2/3) | FIG. 37 (2/4) |

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A system comprising:
a set-top box including a processor and a memory coupled to the processor;
a computerized application deployed in the memory and executable by the processor; and
a data structure deployed in the memory comprising
a video programming product selectable through the computerized application;
a link from the video programming product to a video program identifier, the video program identifier identifying a video program for presentation;
an additional link from the video programming product to a discount; and a poster for displaying a product signage to facilitate selection of the video programming product, wherein the computerized application selects the video programming product after presentation of the poster, selects the discount after selection of the video program, and presents the video program after the selection of the video programming product.

2. The system of claim 1, wherein the data structure further comprises an additional link from the video programming product to an additional video program identifier, the additional video program identifier identifying an additional video program for presentation;

wherein the computerized application selects the additional video program in response to selection of the video program.

3. The system of claim 2, wherein the computerized application traverses the data structure to read the video programming identifier and the additional programming identifier when the video programming product is selected.

4. The system of claim 1, wherein the discount is associated with a video programming content, other programming, general programming service, or combinations thereof.

5. The system of claim 1, wherein the video programming product is an on-demand video programming product.

6. The system of claim 1, wherein the data structure further comprises programming scheduling data associated with the video program to indicate availability of the video program.

7. The system of claim 1, wherein the data structure further comprises product sector data associated with the video program to indicate a category of the video program.

8. The system of claim 1, wherein the data structure further comprises a poster name associated with the poster, and the computerized application selects the video programming product after presentation of the poster and the poster name.

9. The system of claim 1, wherein the video programming product, the link, the additional link from the video programming product to the discount, and the poster are stored in a relational database record in the data structure.

10. The system of claim 1, further comprising:

a head end to provide product information and programming information for the data structure to the set-top box.

11. A method comprising:

presenting, utilizing a set-top box, a poster associated with a video programming product;

receiving, utilizing the set-top box, a selection of the video programming product through a computerized application executing on the processor, the video programming product associated with a video program;

accessing, utilizing the set-top box, a link from the video programming product to a video program identifier, the video program identifier identifying the video program for presentation;

accessing, utilizing the set-top box, an additional link from the video programming product to a discount; and presenting, utilizing the set-top box, availability of the discount based on selection of the video program and at least a portion of the video program based on receipt of the selection and accessing the link.

12. The method of claim 11, further comprising:

enabling selection of an additional video program associated with the video programming product based on selection of the video programming product.

13. The method of claim 11, further comprising:

traversing a data structure to read a video program identifier and an additional programming identifier based on selection of the video programming product; and presenting availability of the video program associated with the video program identifier and an additional video program associated with the additional program identifier based on traversing the data structure.

14. The method of claim 11, wherein receiving the selection comprises:

receiving a selection of the poster associated with the video programming product through the computerized application to select the video programming product.

15. The method of claim 11, further comprising:

accessing a poster name associated with the poster; and generating an acknowledgement message including the poster name based on receipt of the selection of the video programming product.

16. The method of claim 11, further comprising:

accessing a poster from a data structure stored in the set-top box, wherein the link is accessed from the data structure.

17. The method of claim 11, further comprising:

determining that an additional video programming is associated with the video programming product; and presenting an additional poster associated with the additional video programming.

18. The method of claim 11, further comprising:

receiving product information and programming information from a head end; and transmitting billing information to the head end based on selection of the video programming product, wherein the product information received from the head end includes the poster.

19. A non-transitory machine-readable medium comprising instructions, which when executed by one or more processors, cause the one or more processors to perform the following operations:

present a poster associated with a video programming product;

receive a selection of the video programming product through a computerized application executing on the processor;

access a link from the video programming product to a video program identifier, the video program identifier identifying a video program for presentation;

access an additional link from the video programming product to a discount; and present at least a portion of the video program based on receipt of the selection and accessing the link and availability of the discount based on selection of the video program.

20. The method of claim 11, further comprising:

generating a selection list including a plurality of times for selection of a presentation time for the video program; and receiving a time selection of a particular time from the plurality of times;

wherein presenting the portion of the video program is based on the receipt of the selection, accessing the link, and receipt of the time selection.

* * * * *

UNITED STATES PATENT AND TRADEMARK OFFICE
CERTIFICATE OF CORRECTION

| | | |
|---|---|---|
| PATENT NO. | : 8,151,290 B1 | Page 1 of 1 |
| APPLICATION NO. | : 10/124761 | |
| DATED | : April 3, 2012 | |
| INVENTOR(S) | : Ujihara | |

It is certified that error appears in the above-identified patent and that said Letters Patent is hereby corrected as shown below:

In Column 4, Line 2, delete "invention" and insert -- invention; --, therefor.

In Column 7, Line 7, delete "be may" and insert -- may be --, therefor.

In Column 8, Line 44, delete "an character" and insert -- a character --, therefor.

In Column 14, Line 15, delete "an categorized" and insert -- a categorized --, therefor.

In Column 18, Line 64, delete "Dips. channel" and insert -- Disp channel --, therefor.

In Column 20, Line 16, delete "scrolling" and insert -- scrolling. --, therefor.

In Column 20, Line 60, in Claim 1, delete "comprising" and insert -- comprising: --, therefor.

In Column 21, Line 9, in Claim 2, delete "comprises" and insert -- comprises: --, therefor.

Signed and Sealed this
Twentieth Day of November, 2012

David J. Kappos
*Director of the United States Patent and Trademark Office*